(12) United States Patent
Tofighbakhsh

(10) Patent No.: US 9,906,758 B2
(45) Date of Patent: Feb. 27, 2018

(54) METHODS, SYSTEMS, AND PRODUCTS FOR EMERGENCY SERVICES

(71) Applicant: AT&T Intellectual Property I, L.P., Atlanta, GA (US)

(72) Inventor: Mostafa Tofighbakhsh, Cupertino, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 678 days.

(21) Appl. No.: 13/684,500

(22) Filed: Nov. 24, 2012

(65) Prior Publication Data
US 2014/0146170 A1 May 29, 2014

(51) Int. Cl.
*H04N 7/18* (2006.01)
*G08B 25/01* (2006.01)
*H04M 1/725* (2006.01)

(52) U.S. Cl.
CPC ........... *H04N 7/188* (2013.01); *G08B 25/016* (2013.01); *H04M 1/72536* (2013.01); *H04M 1/72572* (2013.01); *H04M 2250/52* (2013.01)

(58) Field of Classification Search
CPC . H04N 7/188; G08B 25/016; H04M 1/72536; H04M 1/72572; H04M 2250/52
See application file for complete search history.

(56) References Cited

U.S. PATENT DOCUMENTS

| | | | |
|---|---|---|---|
| 6,567,502 B2 | 5/2003 | Zellner et al. | |
| 6,618,593 B1* | 9/2003 | Drutman et al. | ........... 455/456.3 |
| 7,617,287 B2* | 11/2009 | Vella et al. | .................... 709/207 |
| 7,844,247 B2 | 11/2010 | Chen et al. | |
| 8,013,734 B2 | 9/2011 | Saigh et al. | |
| 8,014,752 B2 | 9/2011 | Chen et al. | |
| 8,036,631 B2 | 10/2011 | An et al. | |
| 8,165,560 B2 | 4/2012 | Stenquist | |
| 8,970,699 B2* | 3/2015 | Xiao et al. | ..................... 348/148 |
| 9,232,040 B2* | 1/2016 | Barash | ............... G08B 21/0211 |
| 2004/0203563 A1 | 10/2004 | Menard | |
| 2008/0031426 A1 | 2/2008 | Weeks | |
| 2010/0099461 A1 | 4/2010 | Rahfaldt et al. | |
| 2010/0210237 A1 | 8/2010 | Tomer | |
| 2010/0279649 A1 | 11/2010 | Thomas | |
| 2011/0046920 A1 | 2/2011 | Amis | |
| 2011/0130112 A1 | 6/2011 | Saigh et al. | |
| 2011/0224509 A1* | 9/2011 | Fish et al. | ...................... 600/301 |
| 2011/0317007 A1 | 12/2011 | Kim | |
| 2012/0003956 A1 | 1/2012 | Austin et al. | |
| 2012/0028620 A1 | 2/2012 | Roundtree et al. | |
| 2012/0071128 A1 | 3/2012 | Zellner et al. | |
| 2012/0087482 A1 | 4/2012 | Alexander, Sr. | |
| 2012/0225633 A1 | 9/2012 | Nichols | |

\* cited by examiner

*Primary Examiner* — Michael Teitelbaum
(74) *Attorney, Agent, or Firm* — Baker & Hostetler LLP

(57) ABSTRACT

Methods, systems, and products provide emergency services during emergency situations. When an emergency situation is determined, activation commands are sent to activate cameras and/or microphones within a geographic vicinity of the emergency situation. Mobile devices and traffic cameras, for example, are thus instructed to capture image and audio data during the emergency situation.

14 Claims, 26 Drawing Sheets

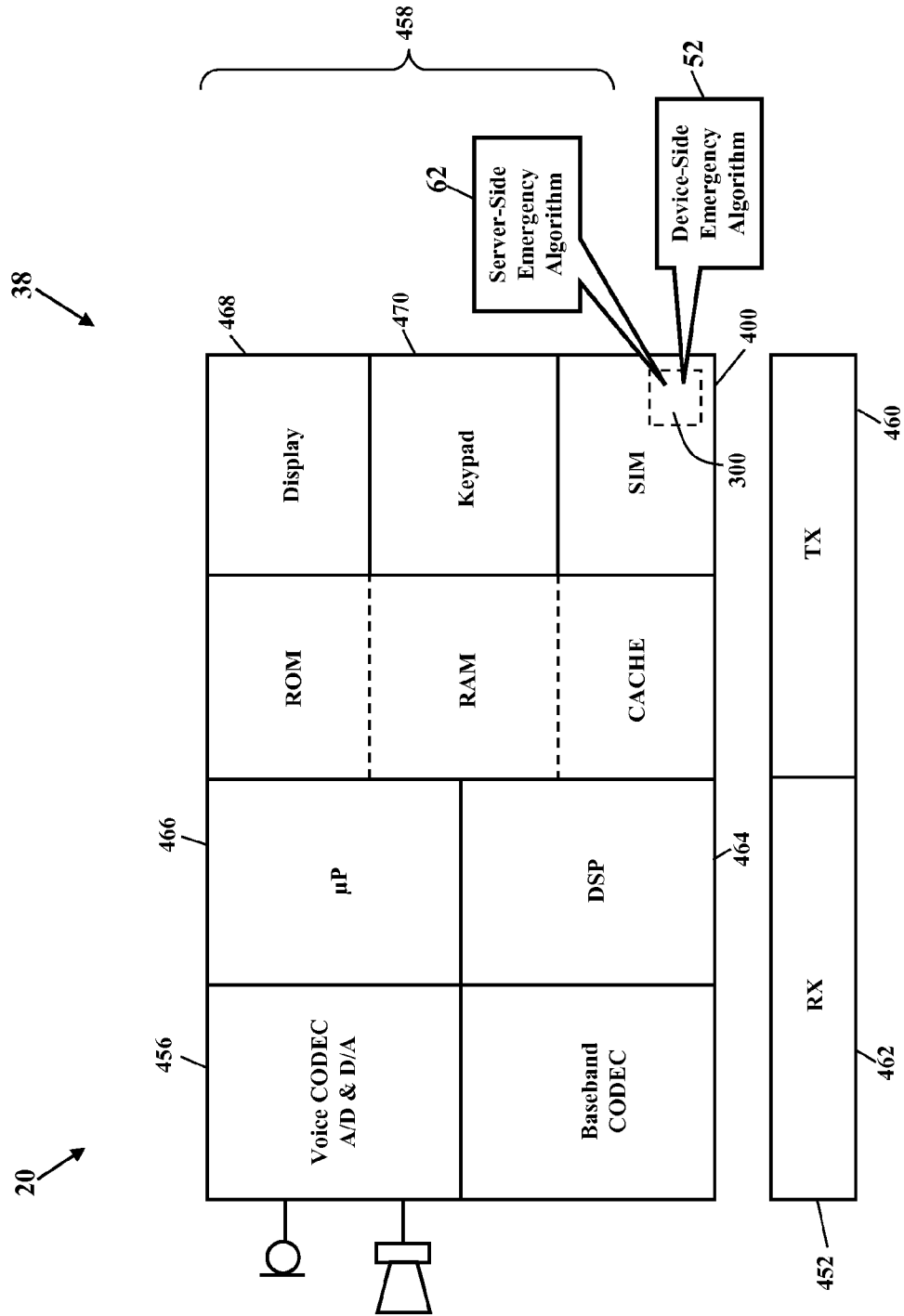

ME THODS, SYSTEMS, AND PRODUCTS FOR EMERGENCY SERVICES

NOTICE OF COPYRIGHT PROTECTION

A portion of the disclosure of this patent document and its figures contain material subject to copyright protection. The copyright owner has no objection to the facsimile reproduction by anyone of the patent document, but otherwise reserves all copyrights whatsoever.

BACKGROUND

Personal safety is of concern to us all. We all desire improvements that increase our personal safety.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein:

FIGS. 24-26 depict still more operating environments for additional aspects of the exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
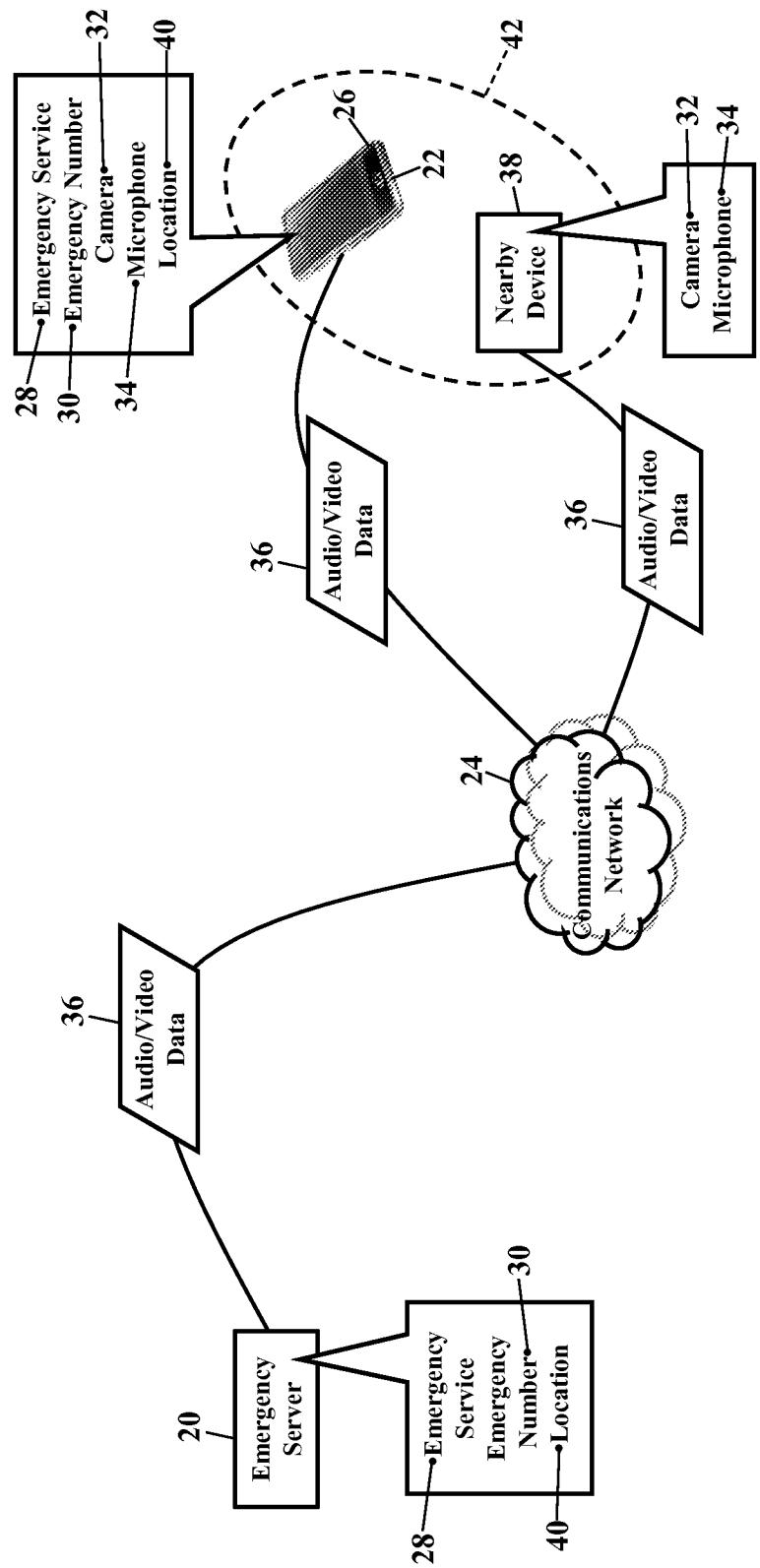
FIG. 1 is a simplified schematic illustrating an environment in which exemplary embodiments may be implemented.

FIG. 1 is a simplified schematic illustrating an environment in which exemplary embodiments may be implemented. An emergency server 20 communicates with a client device 22 via a communications network 24. The client device 22 is illustrated as an end user's mobile smart phone 26, but the client device 22 may be any computer, tablet, or any other processor-controlled device. The emergency server 20 provides one or more emergency services 28 to the client device 22. That is, should the client device 22 signal any emergency situation, the emergency server 20 provides the emergency service 28.

The emergency service 28 may document the emergency situation. For example, the client device 22 may call an emergency number 30 (such as dialing "911"). When the emergency number 30 is detected, the emergency server 20 may instruct the client device 22 to automatically activate a local camera 32 and/or a microphone 34. The client device 22 may thus itself capture audio and/or video data 36 of the emergency situation. The emergency server 20 may then broker or route the audio and/or video data 36 to any destination, such as police and family.

Nearby devices 38 may also be instructed to document the emergency situation. The emergency server 20 may obtain a current location 40 of the client device 22. The emergency server 20 may then determine what other nearby devices 38 are in the vicinity 42 of the client device 22. The emergency server 20 may then instruct those nearby devices 38 to also automatically activate their respective local camera 32 and/or microphone 34. For example, nearby pedestrians and bystanders may have their mobile phones automatically instructed to capture audio and/or video data of the emergency situation. Traffic cameras, as another example, may be instructed to train their lenses to the same emergency situation. Whatever the nearby device 38, additional audio and/or video data may be obtained of the emergency situation.

Exemplary embodiments thus provide the emergency service 28. When the client device 22 signals any emergency situation, exemplary embodiments locate and command the nearby devices 38 to activate their respective data capture capabilities. Whatever the emergency situation, the proximate nearby devices 38 document the emergency situation. Exemplary embodiments may thus co-opt or appropriate the nearby devices 38 and generate cumulative surveillance audio and/or image data of the emergency situation. Any citizen's mobile smart phone 26, in other words, becomes a proxy for good Samaritan assistance to someone in need. Any nearby device 38 may thus support law enforcement efforts and crime reduction initiatives.

Figure 2:
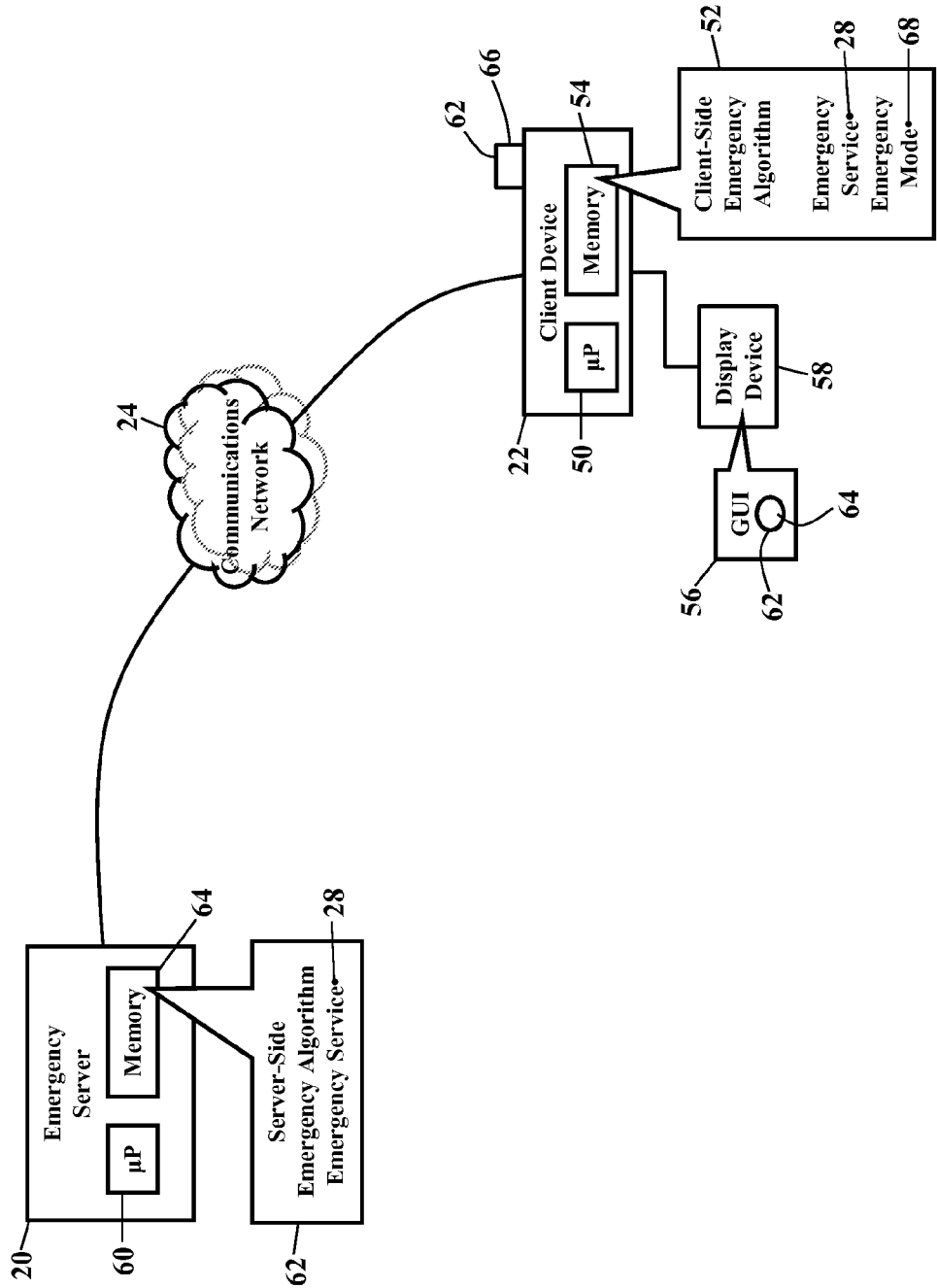
FIG. 2 is a more detailed block diagram illustrating the operating environment, according to exemplary embodiments.

FIG. 2 is a more detailed schematic illustrating an operating environment, according to exemplary embodiments. The emergency server 20 and the client device 22 cooperate to determine any emergency situation. The client device 22 may have a processor 50 (e.g., "µP"), application specific integrated circuit (ASIC), or other component that executes a client-side emergency algorithm 52 stored in a local memory 54. The client-side emergency algorithm 52 may cause the processor 50 to produce a graphical user interface ("GUI") 56 on a display device 58, yet the graphical user interface 56 may also have audio features. The emergency server 20 may also have a processor 60 (e.g., "µP"), application specific integrated circuit (ASIC), or other component that executes a server-side emergency algorithm 62 stored in a memory 64. The client-side emergency algorithm 52 and the server-side emergency algorithm 62 may thus be instructions, code, and/or programs that cooperate to provide the emergency service 28 to the client device 22.

An emergency situation may first be determined. The client device 22 may have any feature for activating the emergency service 28. FIG. 2, for example, illustrates an emergency button 62. The emergency button 62 may be a graphical control 64 displayed by or in the graphical user interface 56. The emergency button 62, however, may also be any physical feature 66 (such as a physical button) protruding from the client device 22. Should an end user touch or depress the emergency button 62, the client-side emergency algorithm 52 may enter an emergency mode 68 of operation. The emergency button 62 may thus be a quick and simple way of signaling any emergency situation.

The emergency situation may also be inferred. Sometimes the end user may make inputs or take actions that indicate an emergency situation. The user, for example, may dial 9-1-1 or any other emergency number 30. When the client-side emergency algorithm 52 detects or recognizes a predetermined input, address, or digit(s), the client-side emergency algorithm 52 may infer an emergency situation. The client-side emergency algorithm 52 may thus enter the emergency mode 68 of operation upon detection or recognition of predetermined actions.

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the IEEE 802 family of standards, GSM/CDMA/TDMA or any cellular standard, and/or the ISM band). The communications network 24 may even include powerline portions, in which signals are communicated via electrical wiring. The concepts described herein may be applied to any wireless/wireline communications network, regardless of physical componentry, physical configuration, or communications standard(s).

Figure 3:
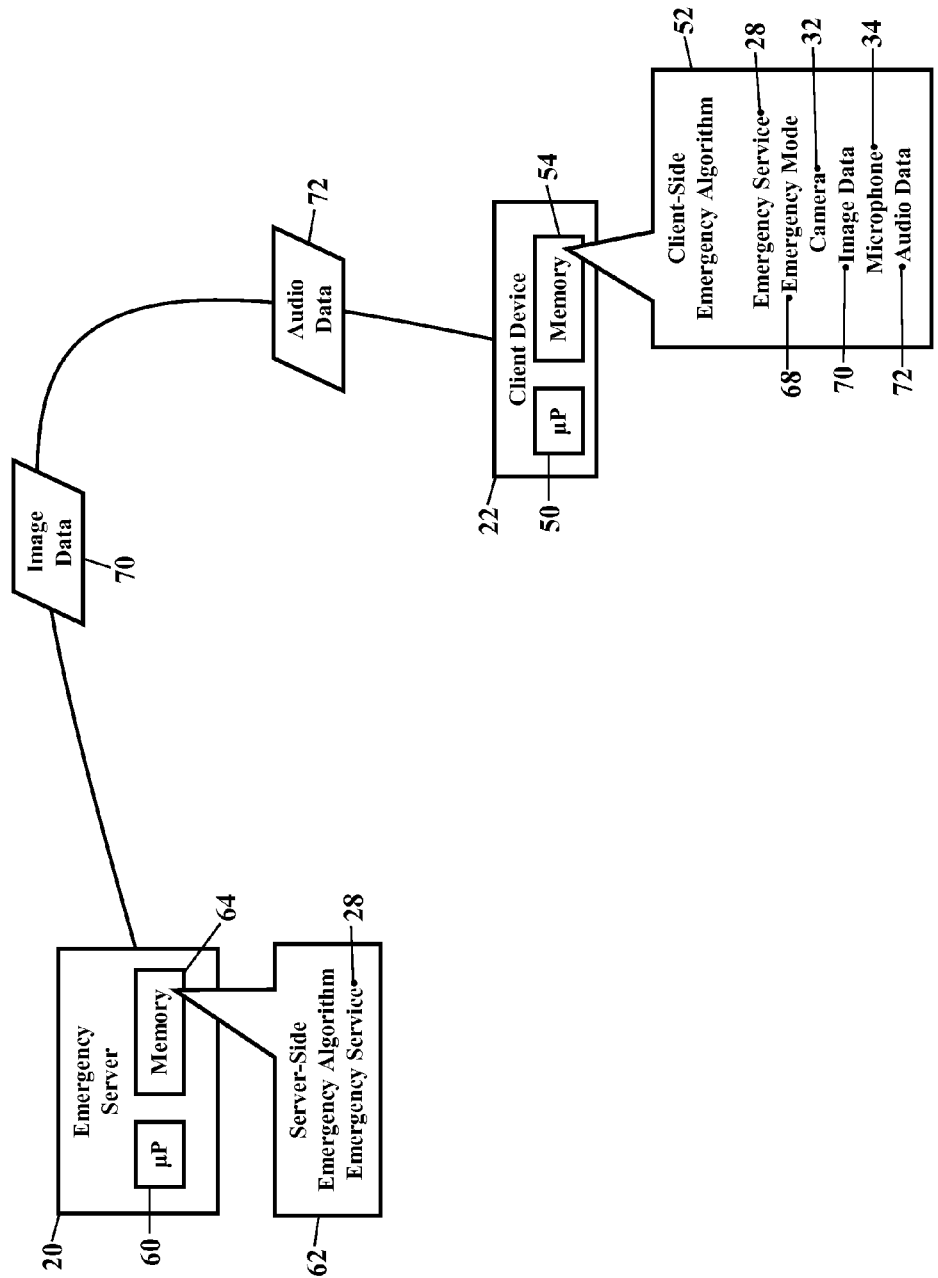
FIG. 3 is a schematic illustrating an emergency mode of operation, according to exemplary embodiments.

FIG. 3 is a schematic further illustrating the emergency mode 68 of operation, according to exemplary embodiments. However the emergency mode 68 of operation is determined, the client device 22 may automatically document the emergency situation. Once the client-side emergency algorithm 52 enters the emergency mode 68 of operation, the client-side emergency algorithm 52 activates any data acquisition capability. Exemplary embodiments, for example, may automatically activate the camera 32 to capture image data 70 of the emergency situation. The image data 70 may be still photos or video, depending on the capability. The microphone 34 may additionally or alternatively be activated to capture audio data 72 of the emergency situation. The image data 70 and the audio data 72 may be locally stored in the memory 54 of the client device 22.

Documentary data may also be shared. The client-side emergency algorithm 52 may cause the client device 22 to copy or send the image data 70 and/or the audio data 72 to any remote destination. FIG. 3, for simplicity, illustrates the client device 22 sending the image data 70 and the audio data 72 to the emergency server 20 (via the communications network 24 illustrated in FIGS. 1-2). Exemplary embodiments, though, may copy or forward the image data 70 and/or the audio data 72 to any network destination, such as police, fire, and family. The emergency server 20 may thus receive and store the documentary evidence that is automatically captured during the emergency situation.

Figure 4:
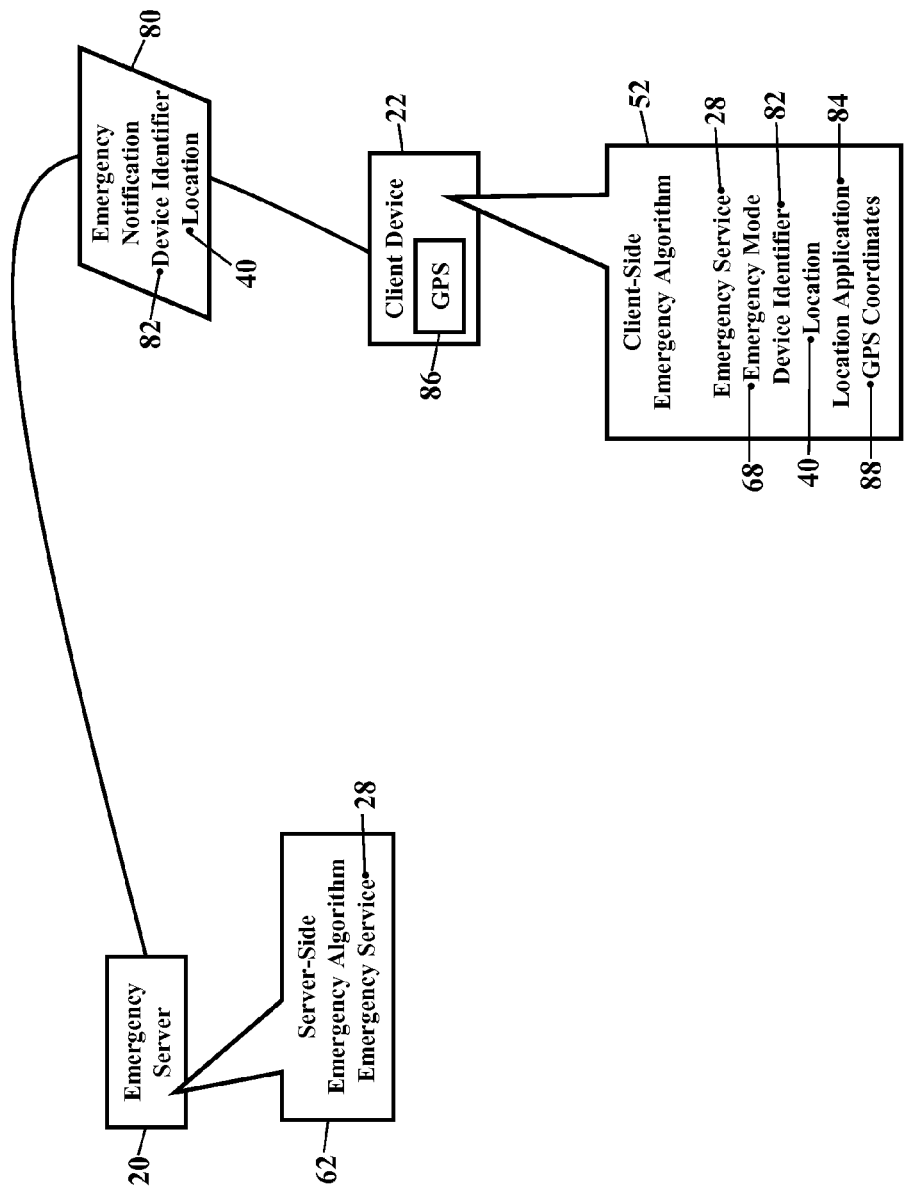
FIGS. 4-10 are schematics illustrating an emergency service, according to exemplary embodiments.

FIGS. 4-10 are schematics illustrating the emergency service 28, according to exemplary embodiments. FIG. 4 illustrates remote notification of the emergency mode 68 of operation. When the client device 22 enters the emergency mode 68 of operation, the client-side emergency algorithm 52 may send an emergency notification 80 to the emergency server 20. The emergency notification 80 routes along the communications network (illustrated as reference numeral 24 in FIGS. 1-2) to the network address associated with the emergency server 20. The emergency notification 80 may include a device identifier 82. The device identifier 82 may be any alphanumeric combination that uniquely identifies the client device 22, such as an Internet protocol address, telephone number, serial number, or any other information. When the emergency server 20 receives the emergency notification 80, the server-side emergency algorithm 62 initiates the emergency service 28 for the client device 22.

Exemplary embodiments may obtain the current location 40 of the client device 22. The client device 22, for example, may send its current location 40 in the emergency notification 80. When the client device 22 enters the emergency mode 68 of operation, the client-side emergency algorithm 52 may activate or call a location application 84 that determines the current location 40. The client device 22, for example, may have a global positioning system ("GPS") 86 that generates GPS coordinates 88. When the emergency notification 80 is sent, the emergency notification 80 may include information describing the current location 40, such as the GPS coordinates 88.

Figure 5:
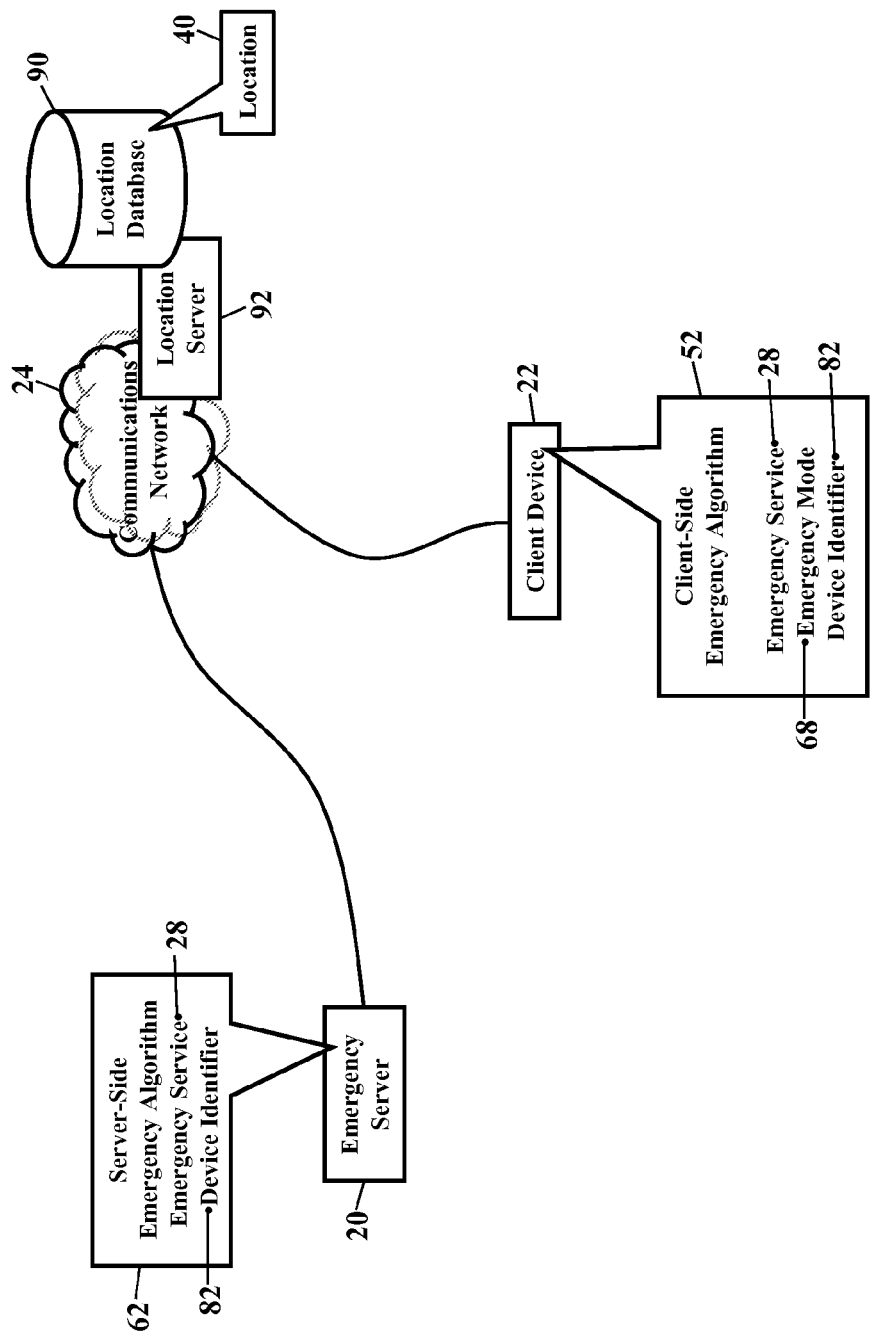

FIG. 5 illustrates an optional location determination. Here exemplary embodiments may query a location database 90. The location database 90 stores location information for any device. A location server 92 stores and maintains the location database 90 at a network address in the communications network 24. The location database 90, for example, may be a home location register ("HLR") that stores location information for devices communicating with the communications network 24. The server-side emergency algorithm 62 may instruct the emergency server 20 to query the location database 90 for the device identifier 82 requesting the emergency service 28. The location database 90 performs query lookup and retrieves the current location 40 associated with the device identifier 82. The location server 92 sends the current location 40 in a query response to the network address associated with the emergency server 20.

Figure 6:
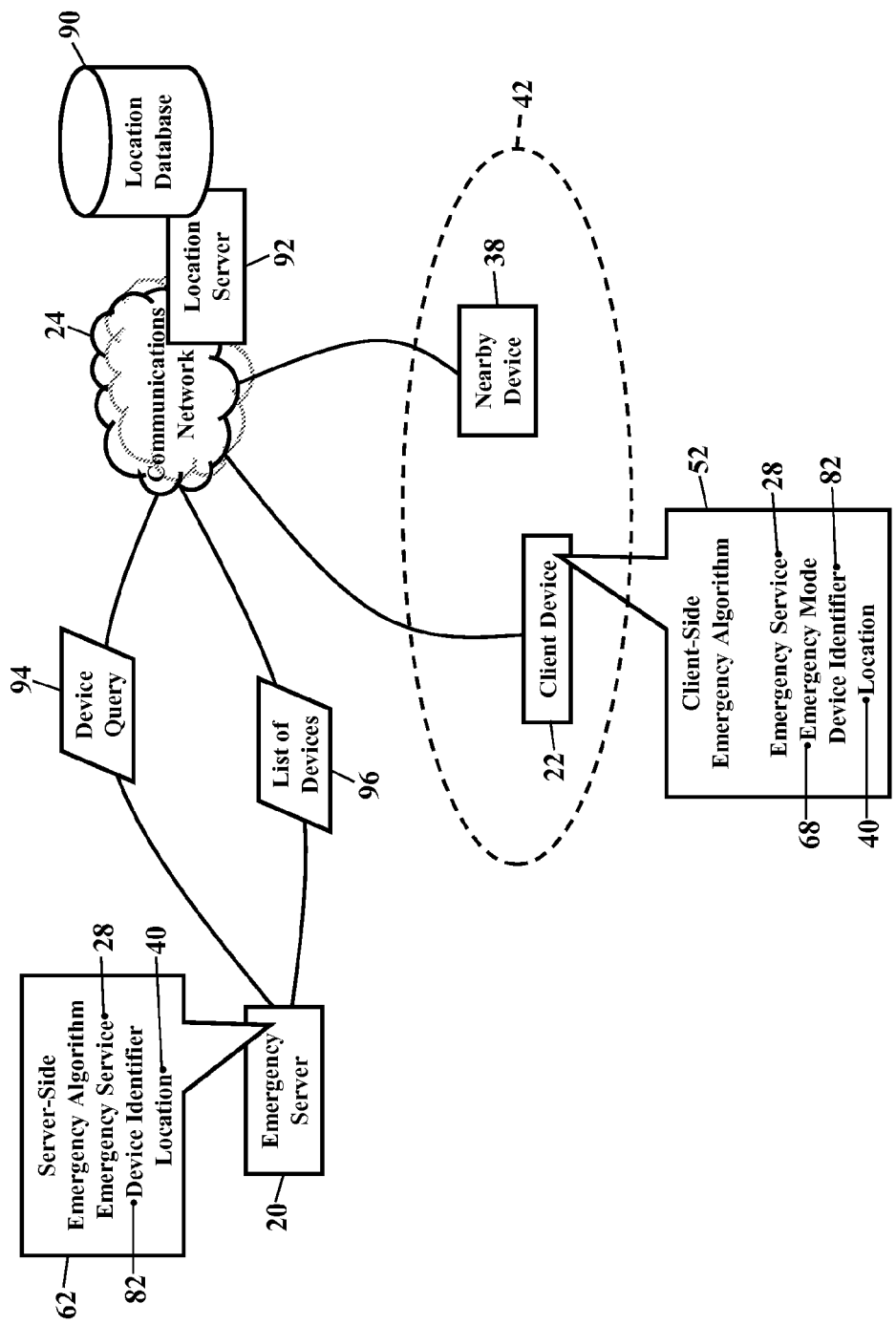

However the current location 40 is determined, FIG. 6 illustrates the nearby device 38. Once the emergency server 20 determines the current location 40 associated with the client device 22 (e.g., the device identifier 82), the emergency server 20 may identify the nearby device(s) 38 having the same or similar location 40. The server-side emergency algorithm 62 may instruct the emergency server 20 to send a device query 94 to the location database 90. The device query 94 may specify the current location 40 and routes to the network address associated with the location server 92. The location server 92 queries the location database 90 for the current location 40 and retrieves a list 96 of devices having the same or similar location 40. That is, exemplary embodiments determine what nearby devices 38 are presently located within the geographic vicinity 42 of the current location 40 of the communications device. The location server 92 sends the list 96 of devices in a query response that routes to the network address associated with the emergency server 20. While FIG. 6 only illustrates a single nearby device 38, in actual practice there may be many, or even hundreds, of nearby devices 38, especially in dense urban cities.

Figure 7:
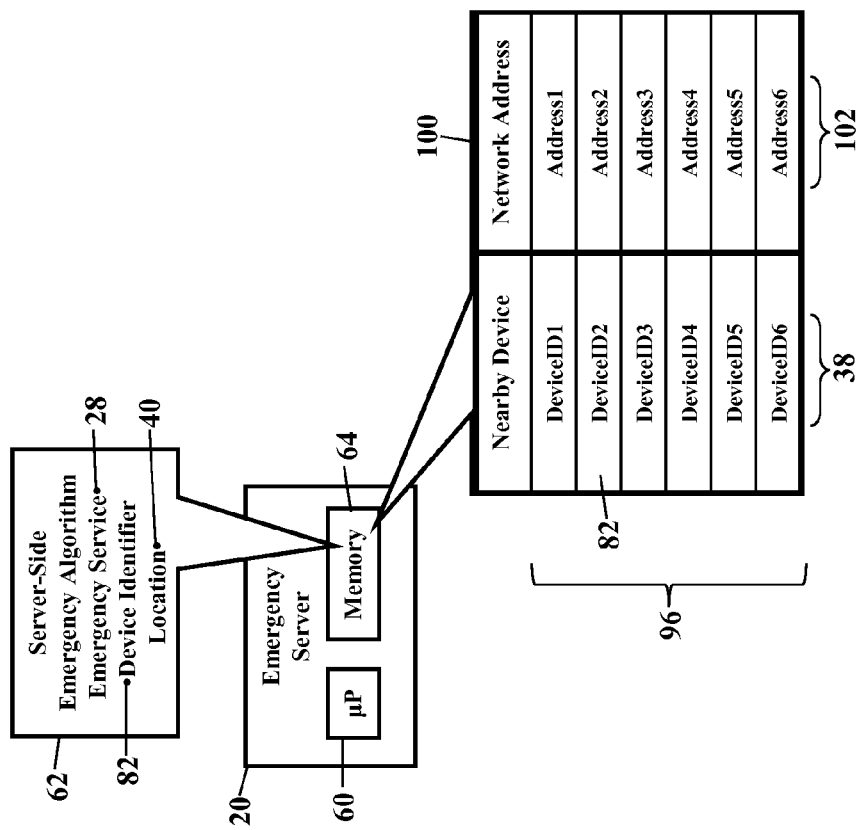

FIG. 7 illustrates the list 96 of devices. When the emergency server 20 receives the list 96 of devices, the server-side emergency algorithm 62 may at least temporarily store the list 96 of devices in the memory 64 of the emergency server 20. FIG. 7 illustrates the list 96 of devices as a table 100 that maps, relates, or otherwise associates each nearby device 38 to its corresponding network address 102. Each nearby device 38 may be formally identified with its corresponding device identifier 82. The emergency server 20 now knows that nearby devices 38 are in the vicinity 42 of the current location 40 associated with the client device 22.

Figure 8:
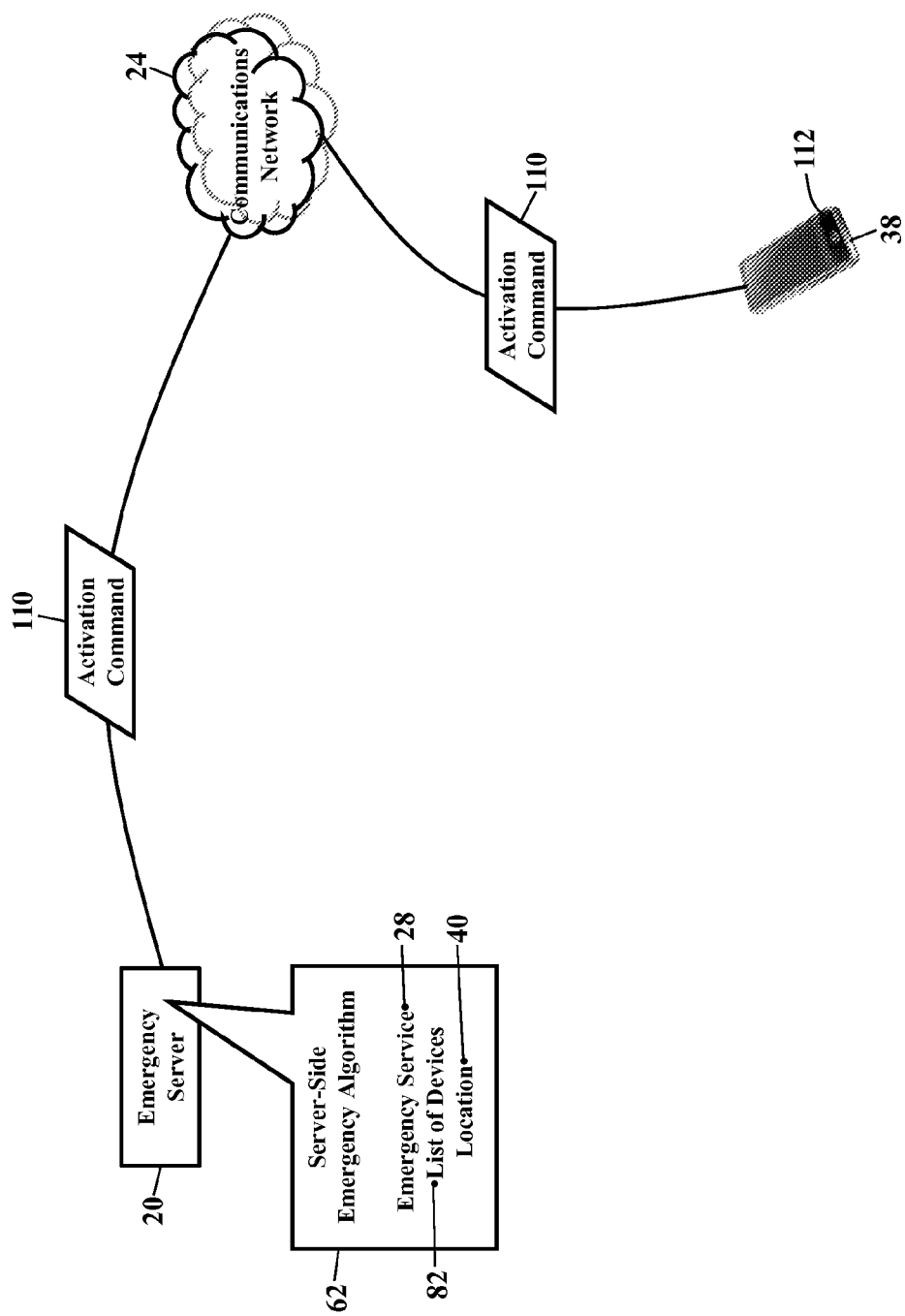

FIG. 8 illustrates an appropriation scheme. The emergency service 28 may co-opt the nearby devices 38 to document the emergency situation. Once the nearby devices 38 are known, the server-side emergency algorithm 62 instructs the emergency server 20 to appropriate any nearby device 38 in the list 96 of devices. The server-side emergency algorithm 62, for example, causes the emergency server 20 to generate an activation command 110. The activation command 110 may be any instruction for activating any software or device capability that acquires any data from the nearby device 38. The server-side emergency algorithm 62 selects any or all of the nearby devices 38 in the list 96 of devices. The server-side emergency algorithm 62 may then instruct the emergency server 20 to send the activation command 110 to any nearby device 38 specified in the list 96 of devices. FIG. 8, for example, illustrates the activation command 110 routing along the communications network 24 to the network address 102 associated with the corresponding nearby device 38. FIG. 8 illustrates the nearby device 38 as a fellow pedestrian's nearby smart phone 112.

Figure 9:
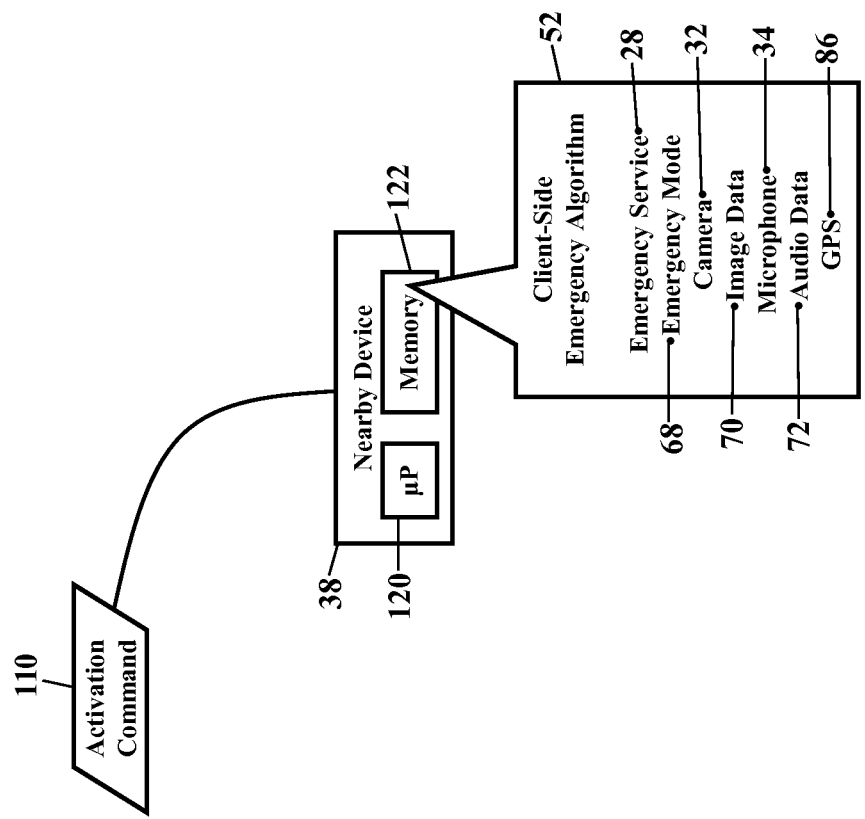

FIG. 9 illustrates data capture. When the nearby device 38 receives the activation command 110, the activation command 110 may at least partially take control of the nearby device 38. That is, the activation command 110 instructs the nearby device 38 to automatically activate its local camera 32, microphone 34, global positioning system 86, and/or any other software and hardware data acquisition capability. As an example, FIG. 9 illustrates the nearby device 38 having its own corresponding processor 120 and memory 122 that stores and executes the client-side emergency algorithm 52. The client-side emergency algorithm 52 may thus be a downloadable software application that recognizes and automatically executes the activation command 110. The activation command 110 may thus cause the nearby device 38 to enter the emergency mode 68 of operation. The nearby device 38 thus automatically starts capturing and storing the image data 70 and/or the audio data 72 of the emergency situation.

Figure 10:
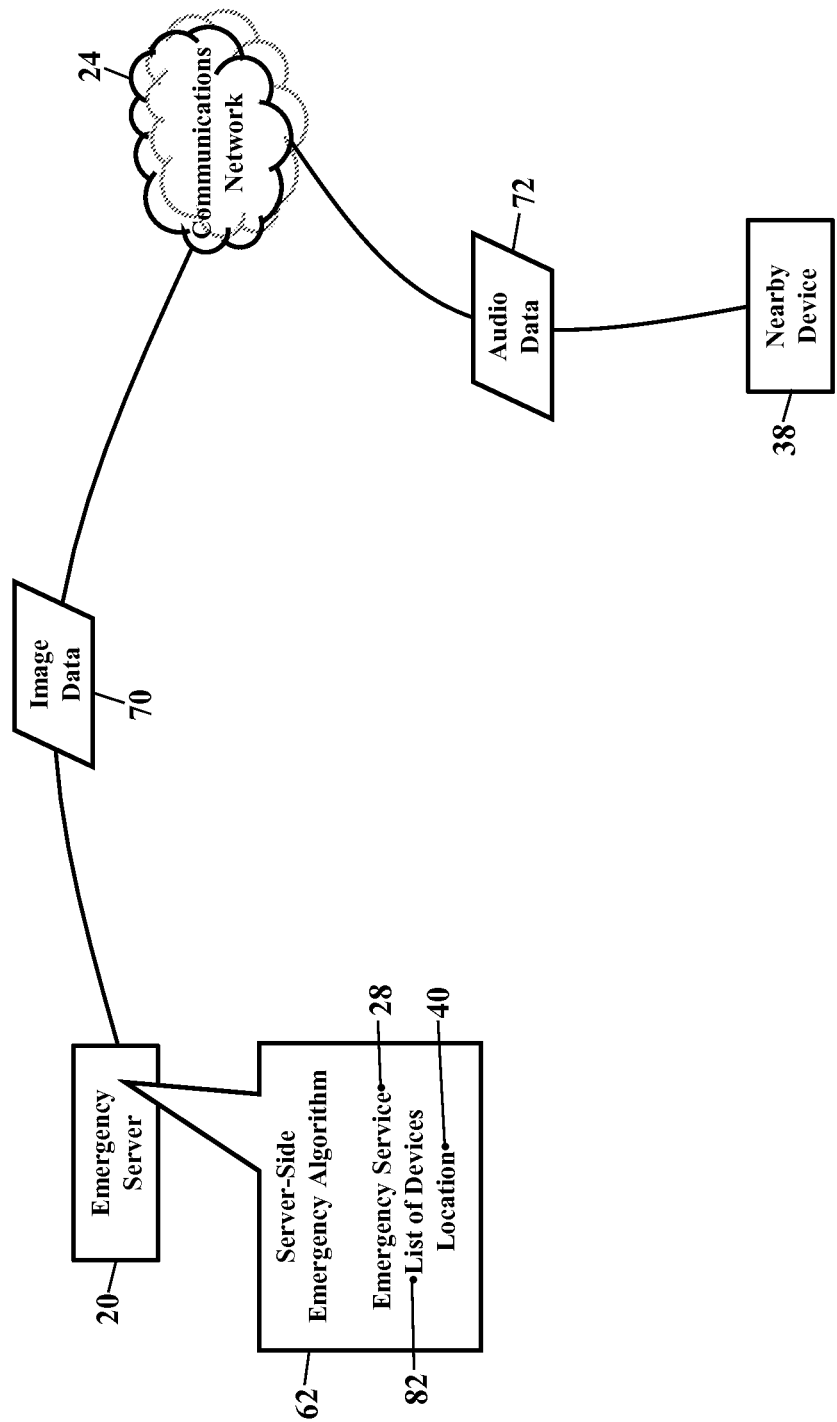

FIG. 10 illustrates cumulative data acquisition. When the nearby device 38 captures the image data 70 and/or the audio data 72, the nearby device 38 may upload the documentary data to any remote destination. FIG. 10, again for simplicity, illustrates the nearby device 38 sending its image data 70 and its audio data 72 to the emergency server 20. The emergency server 20 thus receives and stores the documentary evidence that is automatically captured by the nearby device 38 during the emergency situation.

Figure 11:
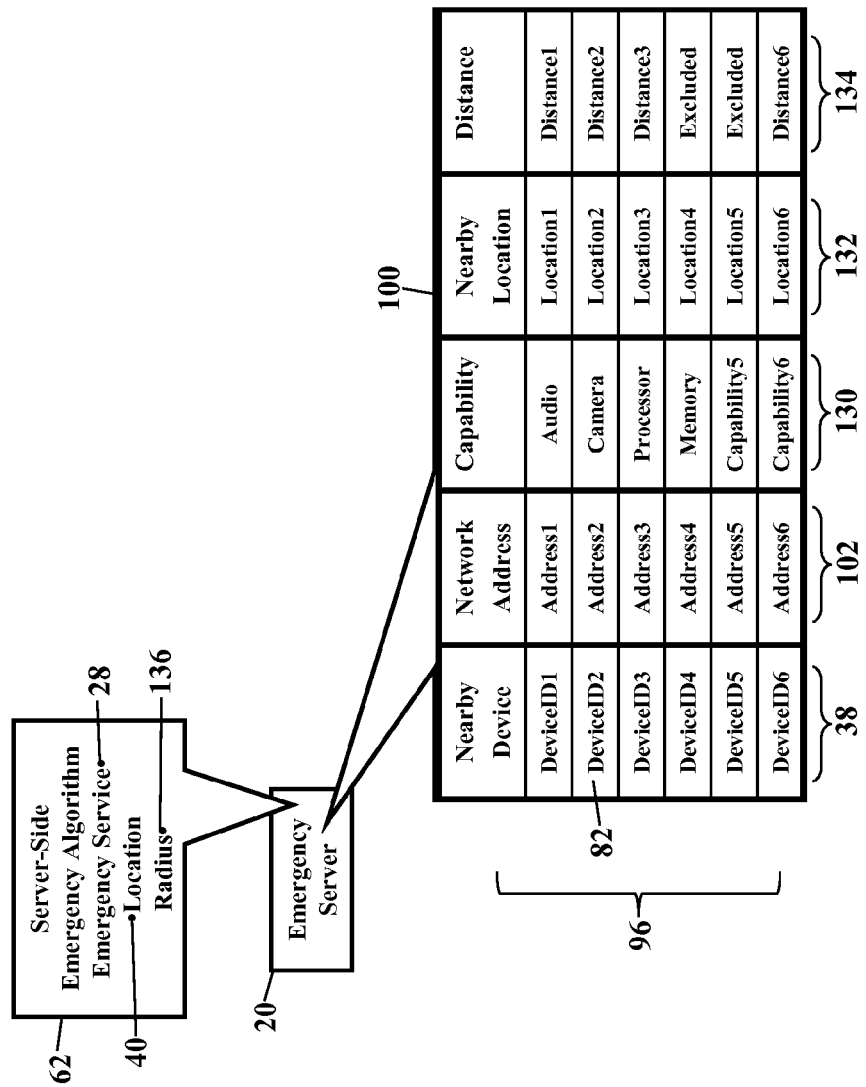
FIGS. 11-13 are schematics illustrating exclusion of a nearby device, according to exemplary embodiments.

FIG. 11 is a schematic illustrating exclusion of a nearby device 38, according to exemplary embodiments. When the emergency server 20 queries for the nearby devices 38, exemplary embodiments may limit or exclude some nearby devices 38. Some nearby devices 38, for example, may be excluded based on hardware or software capability 130. A nearby device 38 that has an inoperative or unresponsive camera or microphone may be unable to document the emergency situation. If a nearby device 38 lacks enough memory to store video data, that nearby device 38 may be excluded. If any nearby device 38 lacks any capability that impairs data acquisition, that nearby device 38 may be excluded.

A nearby device 38 may also be excluded based on location. When the emergency server 20 queries for the nearby devices 38, the list 96 of devices may include the nearby location 132 associated with each nearby device 38. Each nearby device 38 has its own nearby location 132, which may differ from the location 40 of the client device 22. Once the nearby location 132 is known, some nearby devices 38 may have an obstructed view of the emergency situation. Some nearby devices 38, for example, may be located in a grove of trees, or behind a building, that obstructs the view of the emergency situation. The emergency server 20 may thus exclude any nearby device 38 in the list 96 of devices based on an obstructed view of the emergency situation.

Exemplary embodiments may exclude based on distance 134. When the emergency server 20 queries for the nearby devices 38, the list 96 of devices may include the nearby location 132 associated with each nearby device 38. The server-side emergency algorithm 62 may thus calculate the distance 134 between the current location 40 of the client device 22 (requesting the emergency service 28) and each nearby device 38 in the list 96 of devices. The server-side emergency algorithm 62 may also be configured to exclude any nearby devices 38 lying outside a radius 136 from the current location 40 of the client device 22. If any distance 134 exceeds the radius 136, then the corresponding nearby device 38 may be excluded from the emergency service 28.

Exemplary embodiments, in other words, may only appropriate those nearby devices 38 having the geographic vicinity 42 within the predetermined radius 136 of the client device 22 requesting the emergency service 28.

Figure 12:
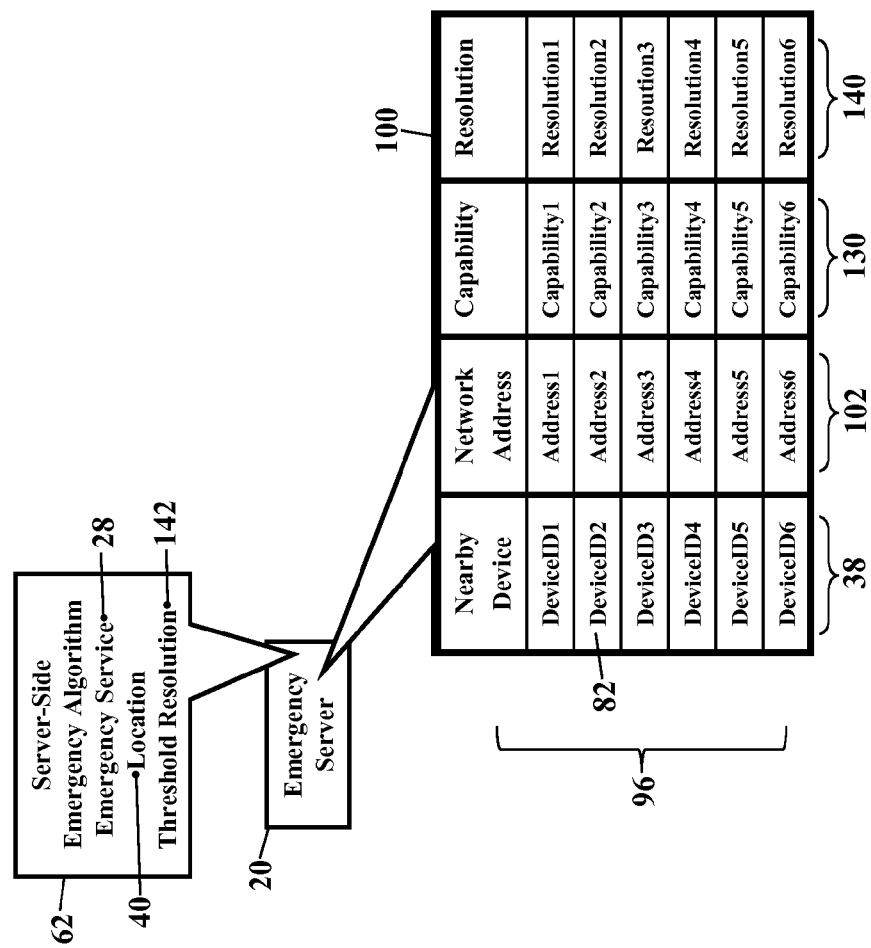

FIG. 12 is another schematic illustrating exclusion of a nearby device 38, according to exemplary embodiments. Here exemplary embodiments may exclude based on resolution 140 of the camera 32. Even though a nearby device 38 may have a video/photo/image capability 130, the resolution 140 of the corresponding camera lens may be too low for quality image data 70. Law enforcement may especially only want image data 70 of high resolution 140 for evidentiary considerations. When the emergency server 20 receives the list 96 of devices, each nearby device 38 may also include entries for its corresponding camera resolution 140. The server-side emergency algorithm 62 may thus filter any entries having the resolution below a threshold resolution 142. The server-side emergency algorithm 62 may thus only activate those nearby devices 38 having the requisite minimum threshold resolution 142.

Figure 13:
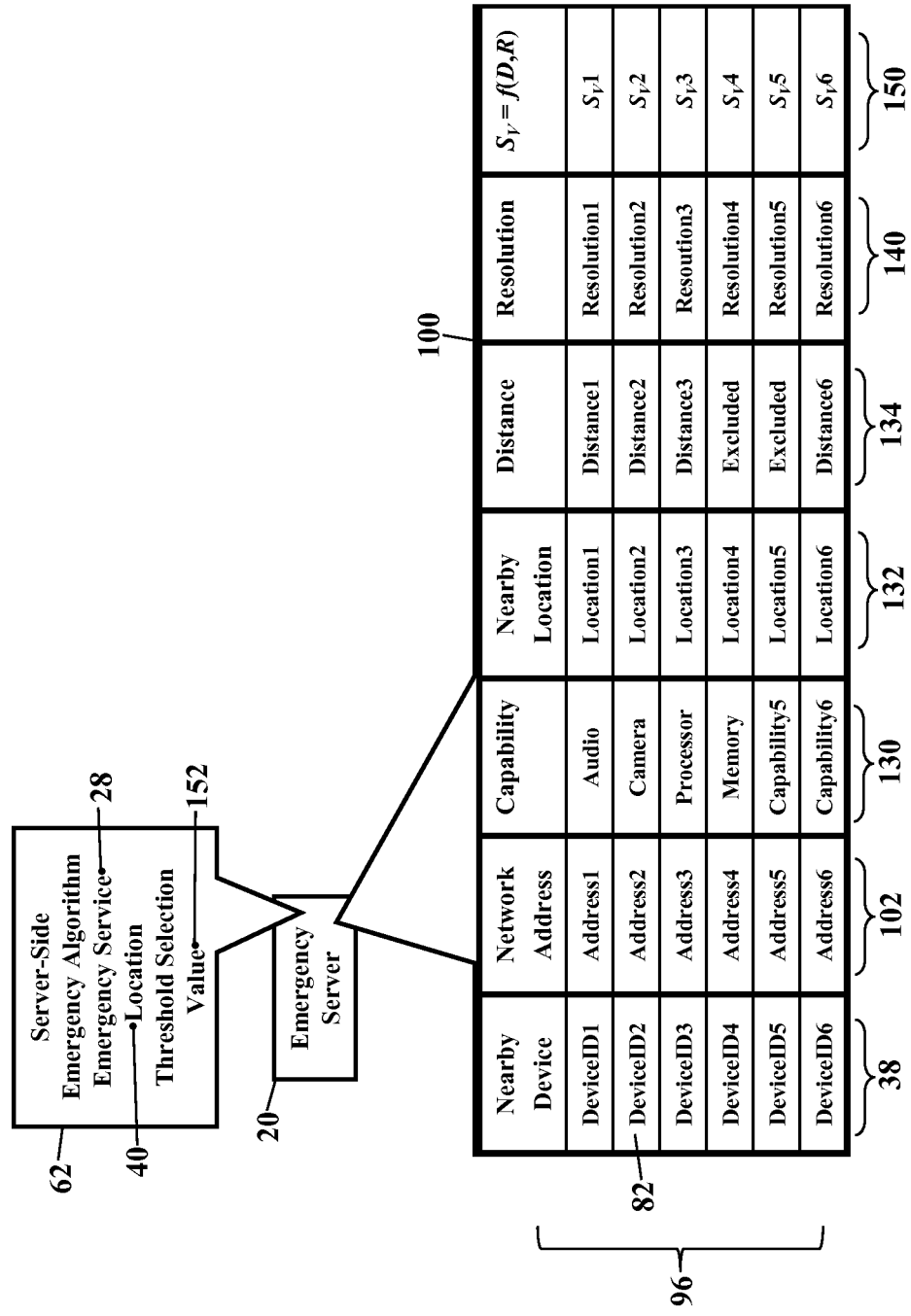
Figure 14:
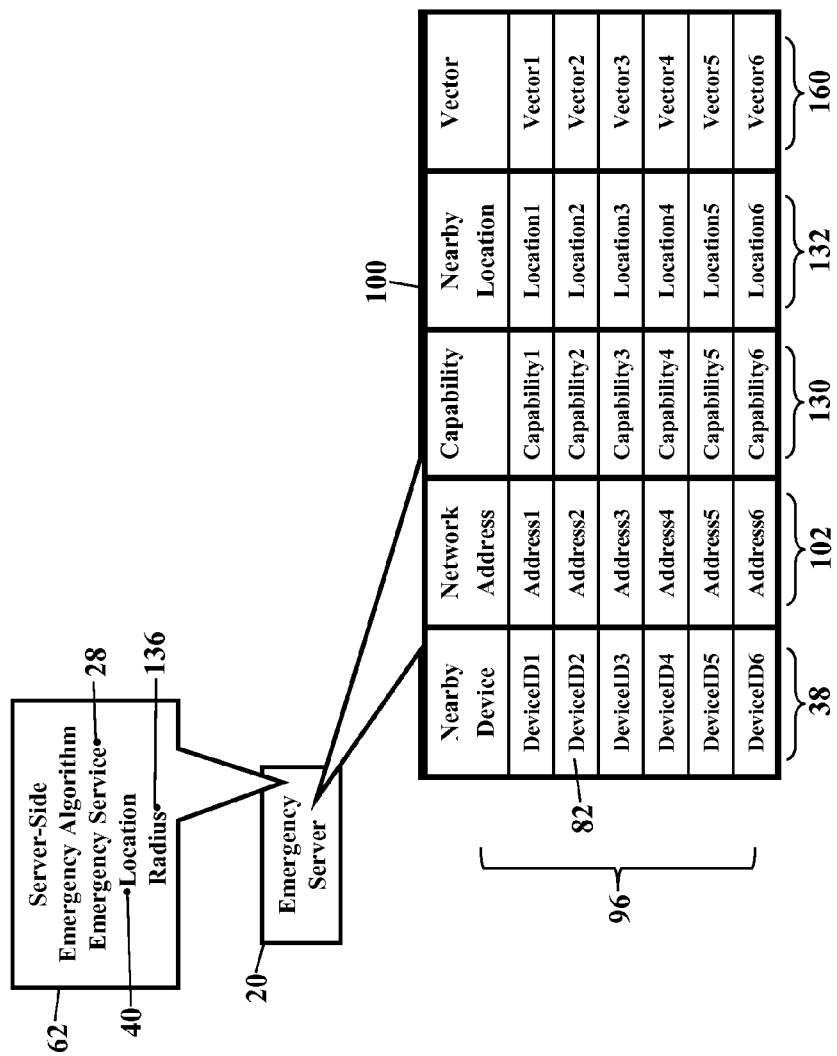
FIGS. 14-20 are schematics illustrating vectorizations, according to exemplary embodiments.

FIG. 13 is another schematic illustrating exclusion of a nearby device 38, according to exemplary embodiments. Here exemplary embodiments may exclude based on both the distance 134 and the resolution 140. A low resolution camera may be adequate at short distances, while a high resolution camera may be required from farther distances. Exemplary embodiments may thus balance both the distance 134 and the resolution 140 when making exclusion decisions. As FIG. 13 illustrates, the server-side emergency algorithm 62 may calculate a selection value $S_V$ (illustrated as reference numeral 150) as $$S_V = f(\text{distance}, \text{resolution}),$$

where the distance 134 and the resolution 140 may be mathematically and/or functionally combined. The selection value $S_V$ may thus be compared to a threshold selection value 152. The server-side emergency algorithm 62 may thus only send the activation command 110 to those nearby devices 38 having the requisite minimum selection value $S_V$.

Figure 15:
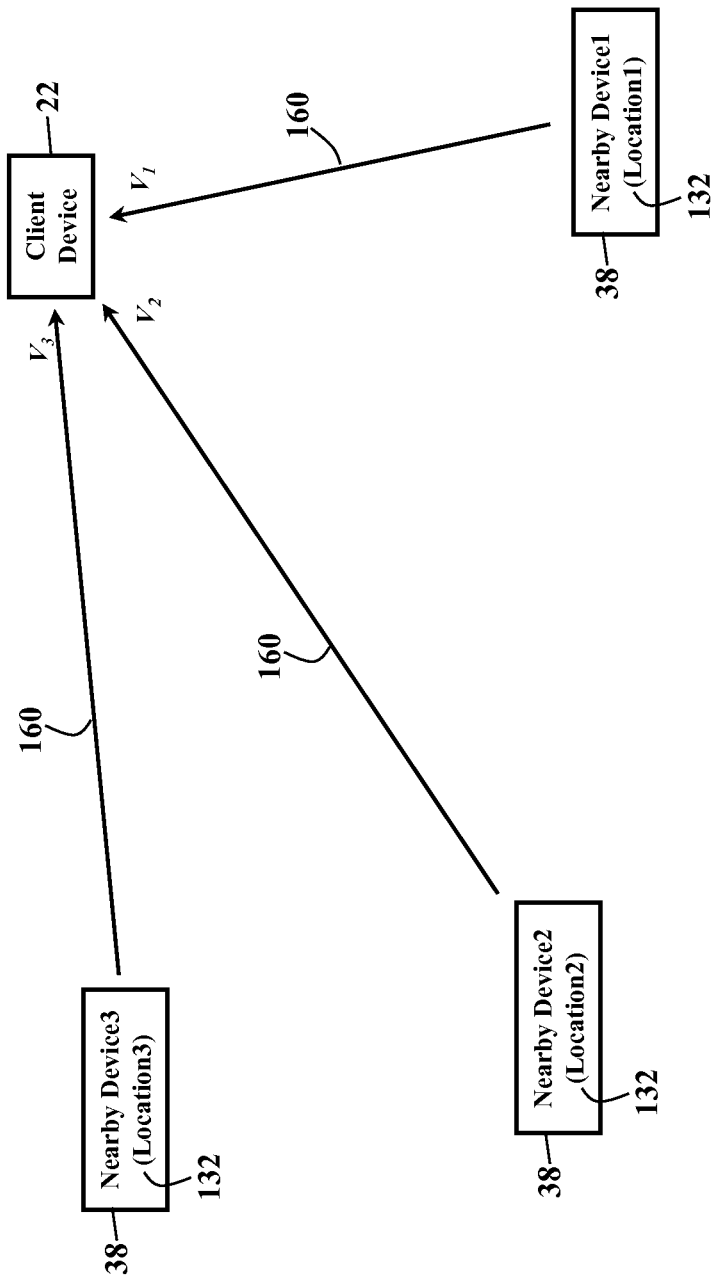

FIGS. 14-20 are schematics illustrating vectorizations, according to exemplary embodiments. Here exemplary embodiments may determine a directional vector 160 to the client device 22 requesting the emergency service 28. The directional vector 160 helps a nearby user of the nearby device 38 orient to the emergency situation. When the emergency server 20 queries for the nearby devices 38, the location server 92 responds with the list 96 of devices. As earlier paragraphs explained, the list 96 of devices may include the nearby location 132 of each nearby device 38. The server-side emergency algorithm 62 may thus determine the directional vector 160 from each nearby device 38 to the client device 22 requesting the emergency service 28. The vector 160 may be determined from the nearby location 132 of the nearby device 38 to the location 40 of the client device 22. As FIG. 15 illustrates, the vector 160 may plot or start from the coordinates of the corresponding nearby device 38 to the coordinates of the client device 22. The server-side emergency algorithm 62, for example, may compare longitudes and latitudes (e.g., perhaps the GPS coordinates 88 illustrated in FIG. 4) to determine the vector 160.

Figure 16:
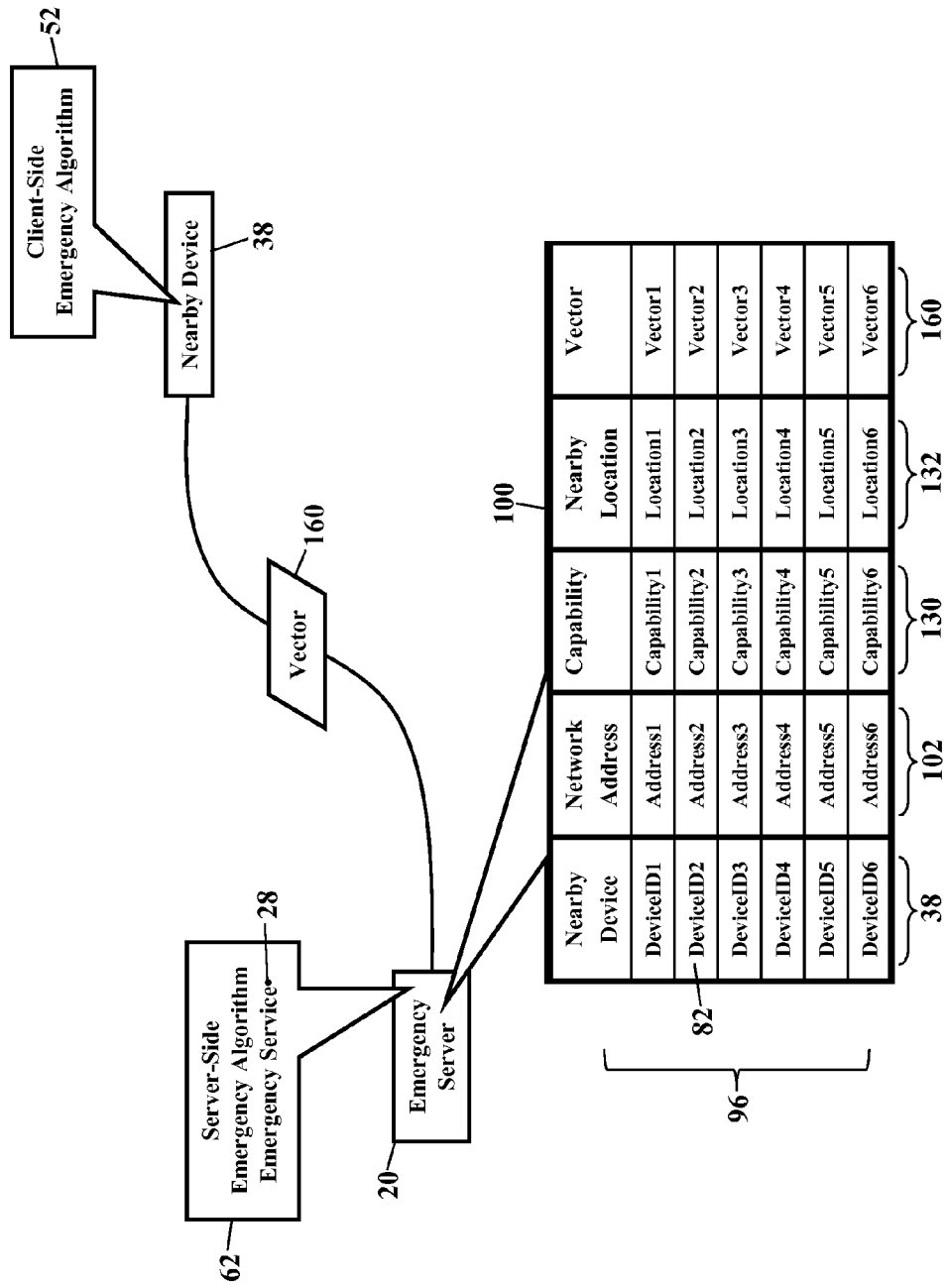

As FIG. 16 illustrates, the vector 160 may be shared with the nearby device 38. Once the vector 160 is determined, the vector 160 may be sent to the nearby device 38. The server-side emergency algorithm 62 may instruct the emergency server 20 to send the vector 160 to the nearby device 38. The vector 160 may be sent as two or three dimensional parameters or coordinates in a message to the network address associated with the nearby device 38.

Figure 17:
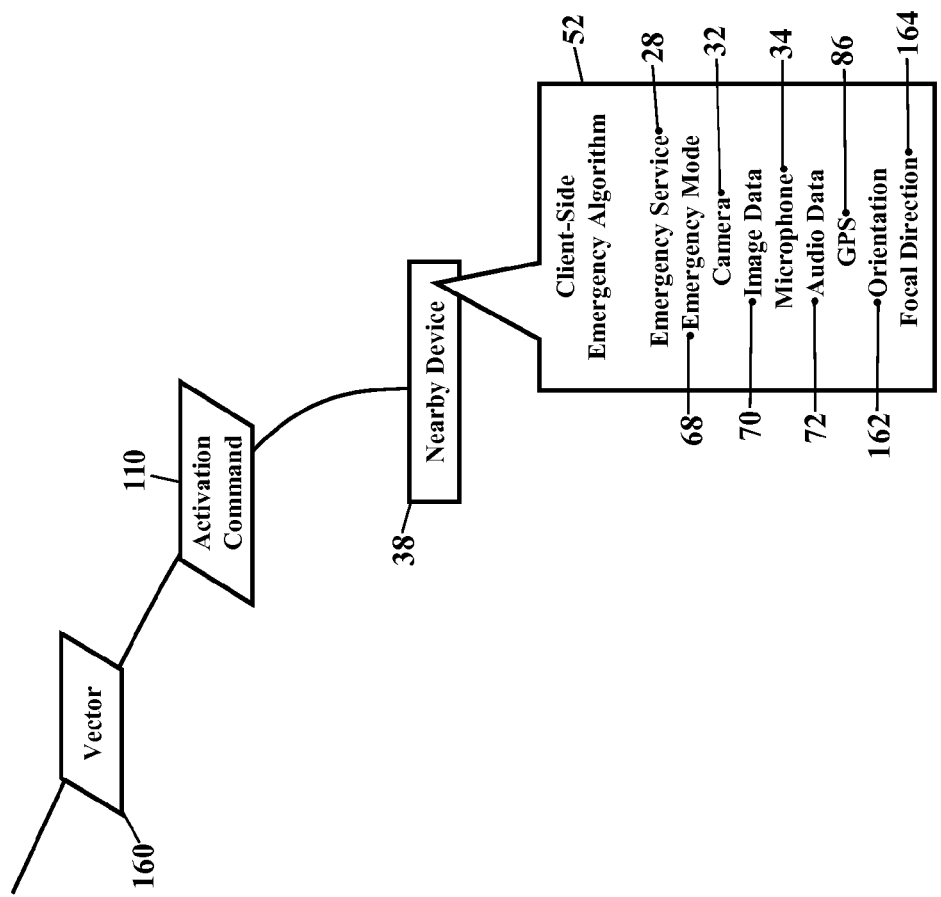

FIG. 17 illustrates orientation. The nearby device 38 has received the activation command 110 and the vector 160. The activation command 110 causes the client-side emergency algorithm 52 to activate the local camera 32, microphone 34, global positioning system 86, and any other data acquisition capability. The vector 160 allows these data acquisition capabilities to be oriented to the vector 160. The emergency service 28 enlists or appropriates the nearby device 38 for data acquisition. Even though the nearby device 38 is chosen, the nearby device 38 needs to orient to the direction of the emergency situation. Data acquisition will likely be unhelpful if the camera 32 and microphone 34 are oriented to the wrong direction. When the client-side emergency algorithm 52 receives the vector 160, the client-side emergency algorithm 52 may execute an orientation 162. That is, the client-side emergency algorithm 52 may align the camera 32 and microphone 34 to the vector 160. The client-side emergency algorithm 52 thus helps ensure the nearby device 38 orients to the direction of the client device 22 requesting the emergency service 28. The client-side emergency algorithm 52, for example, may compare a focal direction 164 in which the camera 32 is pointed. The client-side emergency algorithm 52 aligns the focal direction 164 to the vector 160 representing the direction to the client device 22. Indeed, the client-side emergency algorithm 52 may a parallel or co-linear alignment to ensure the camera 32 points in the same direction as the vector 160. The client-side emergency algorithm 52 may, likewise, align the microphone 34 to the vector 160 to capture the audio data 72 from the direction of the client device 22.

Figure 18:
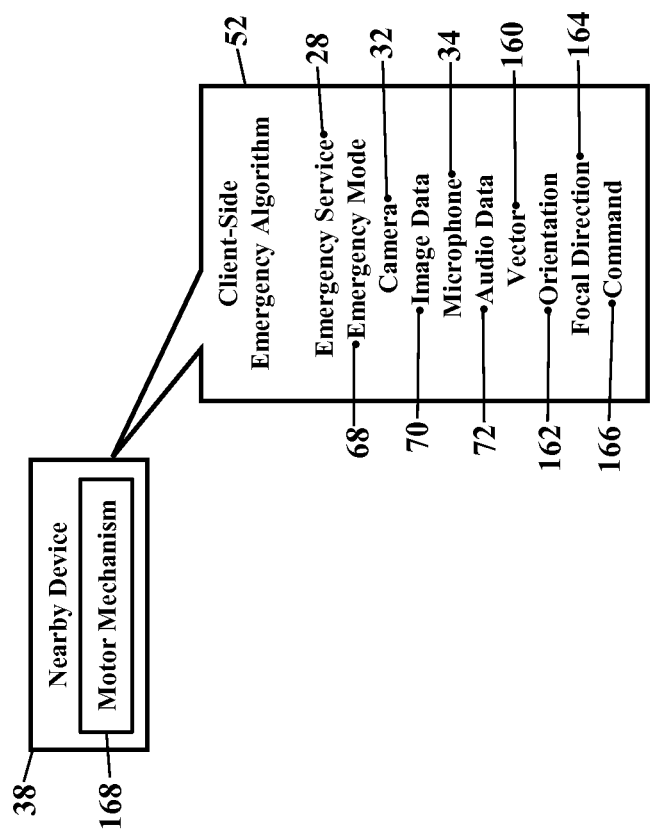

FIG. 18 further illustrates the orientation 162. When the client-side emergency algorithm 52 performs the orientation 162 to the vector 160, the client-side emergency algorithm 52 may generate commands 166 to a motor mechanism 168 to move the camera 32 and/or microphone 34. However, many nearby devices 38 may be smart phones, tablets, and other mobile devices which lack mechanized alignment. Many nearby devices 38, in other words, must be manually aligned to the vector 160.

Figure 19:
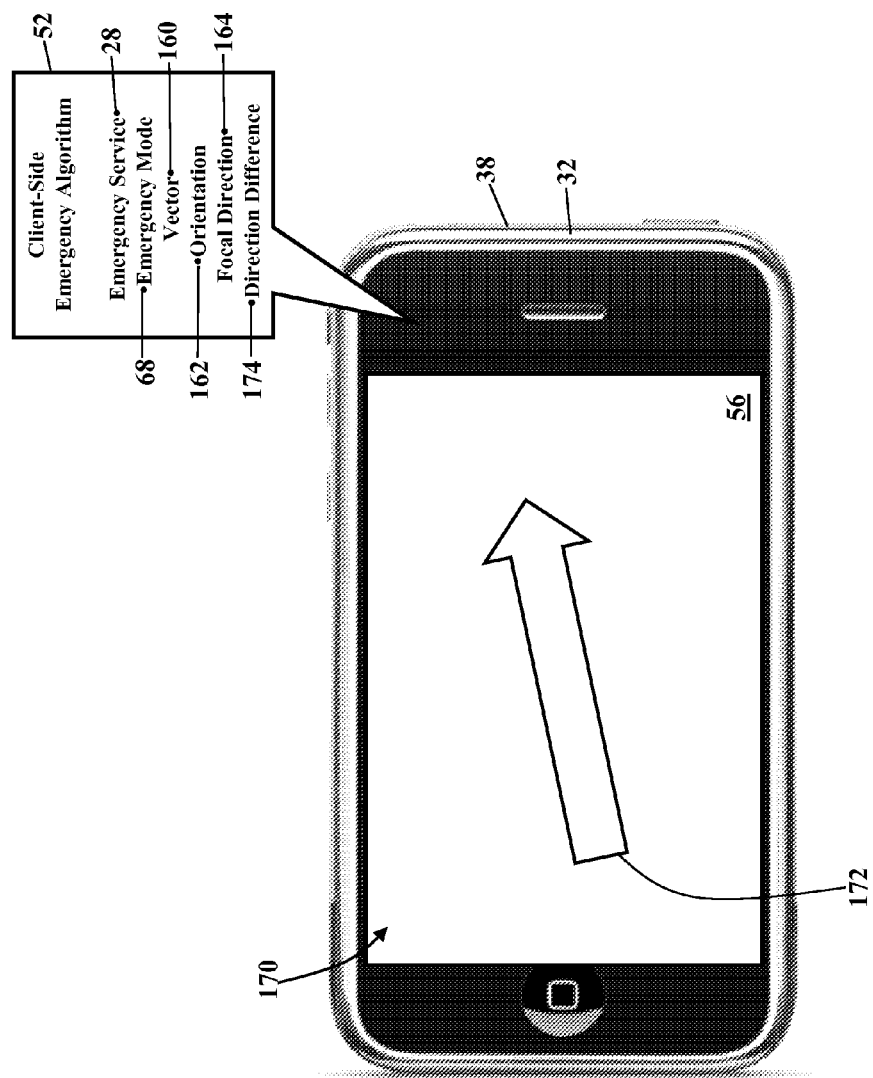

FIG. 19, then, illustrates the graphical user interface 56. When the nearby device 38 must be manually aligned to the vector 160, the client-side emergency algorithm 52 may generate and display an orientation aid 170. The orientation aid 170 may be any visual scheme that helps the nearby user to orient her nearby device 38 to the vector 160. FIG. 19, for example, illustrates a graphical arrow 172 that points to the direction of the vector 160. As the client-side emergency algorithm 52, for example, compares the focal direction 164 of the camera 32 to the vector 160, the client-side emergency algorithm 52 may determine a direction difference 174. The client-side emergency algorithm 52 may thus generate and display the graphical arrow 172 to minimize the directional difference 174 between the focal direction 164 of the camera 32 and the vector 160. The nearby user may thus move or orient her nearby device 38 in the direction of the graphical arrow 172. As the user orients her nearby device 38, the client-side emergency algorithm 52 may repeatedly compare the focal direction 164 of the camera 32 to the vector 160 and re-compute the direction difference 174. If the user correctly orients her nearby device 38, eventually the direction difference 174 will be a minimum value or even zero (0).

Figure 20:
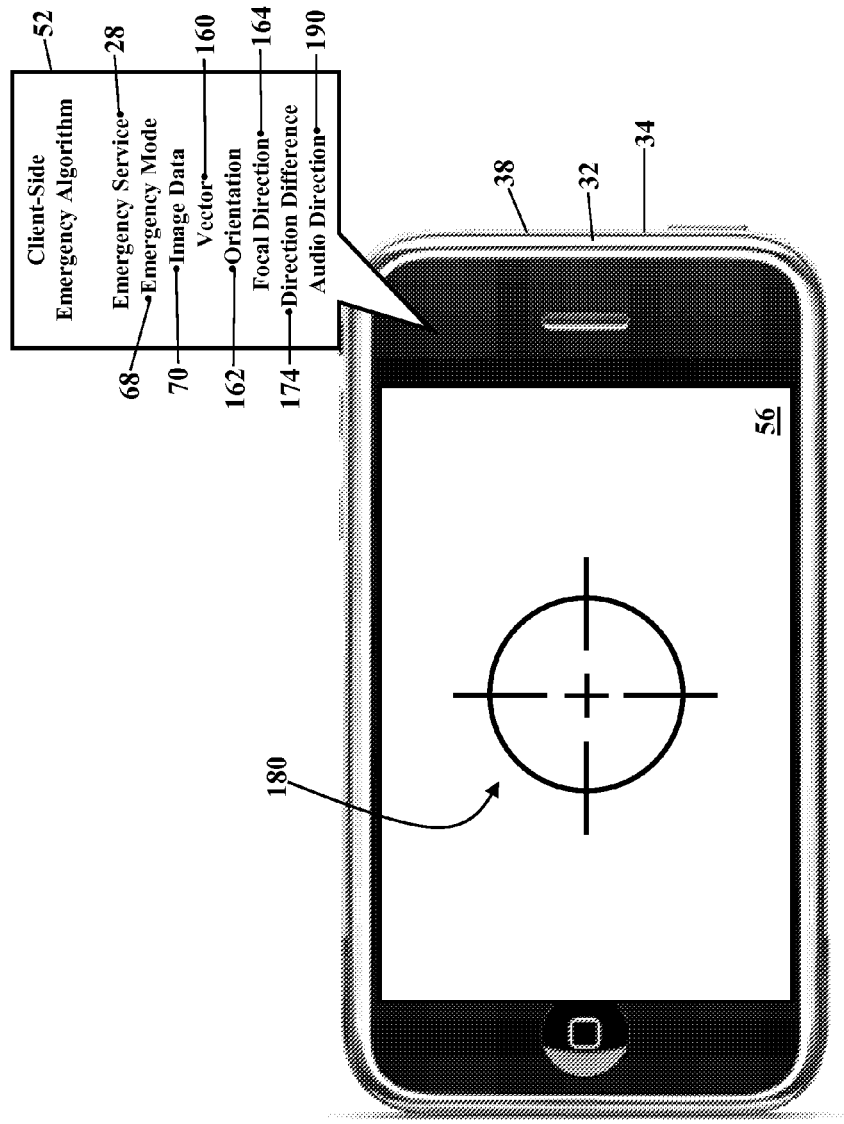

FIG. 20 illustrates a bulls eye 180. If the user correctly orients her nearby device 38, the direction difference 174 will be the minimum value (such as zero difference). The client-side emergency algorithm 52 may thus generate and cause display of some visual indication that the orientation 162 is correct. The graphical bulls eye 180 is thus one such visual indication that the camera 32 is pointed to the emergency situation. The user thus holds or maintains the current position of her nearby device 38 as the image data 70 is acquired. Should the user stray from the correct orientation 162, the client-side emergency algorithm 52 may repeat the comparison of the focal direction 164 of the camera 32 to the vector 160 to reorient the nearby device 38. Should the vector 160 change, the client-side emergency algorithm 52 will also reorient the camera 32 to the vector 160.

Exemplary embodiments may similarly orient the microphone 34. The microphone 34 may be a common Omnidirectional microphone or a directional microphone. Regardless, the microphone 34 may also be oriented to the vector 160. The client-side emergency algorithm 52 may thus compare an audio direction 190 of the microphone 34 to the vector 160 and determine the direction difference 174. The graphical user interface 56 may displays the graphical arrow (illustrated as reference numeral 172 in FIG. 19) to help the user orient her nearby device 38. When the direction difference 174 is at least near the minimum value, the graphical user interface 56 may change to display the bulls eye 180. The microphone 34 is thus oriented to the emergency situation.

Figure 21:
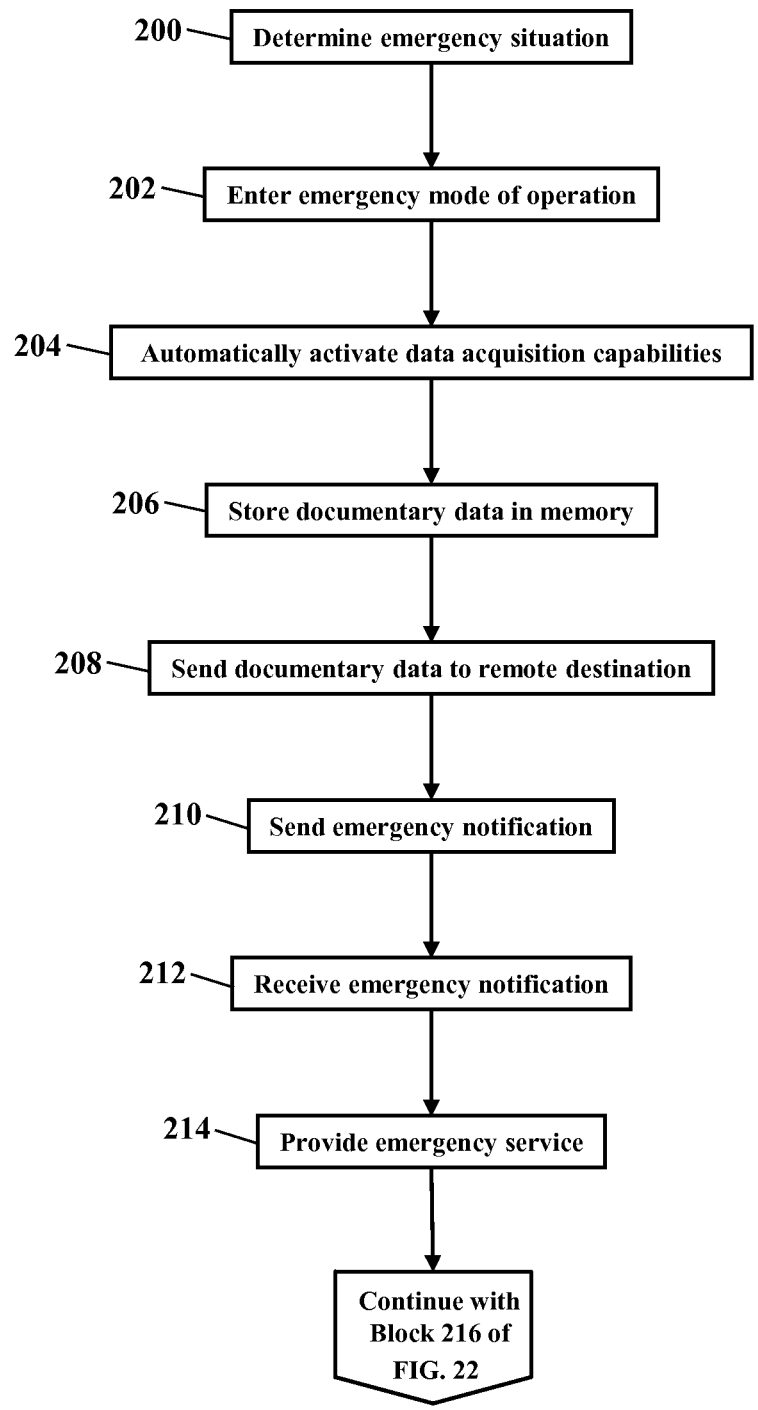
FIGS. 21-23 are flowcharts illustrating a method or algorithm for emergency services, according to exemplary embodiments.
Figure 22:
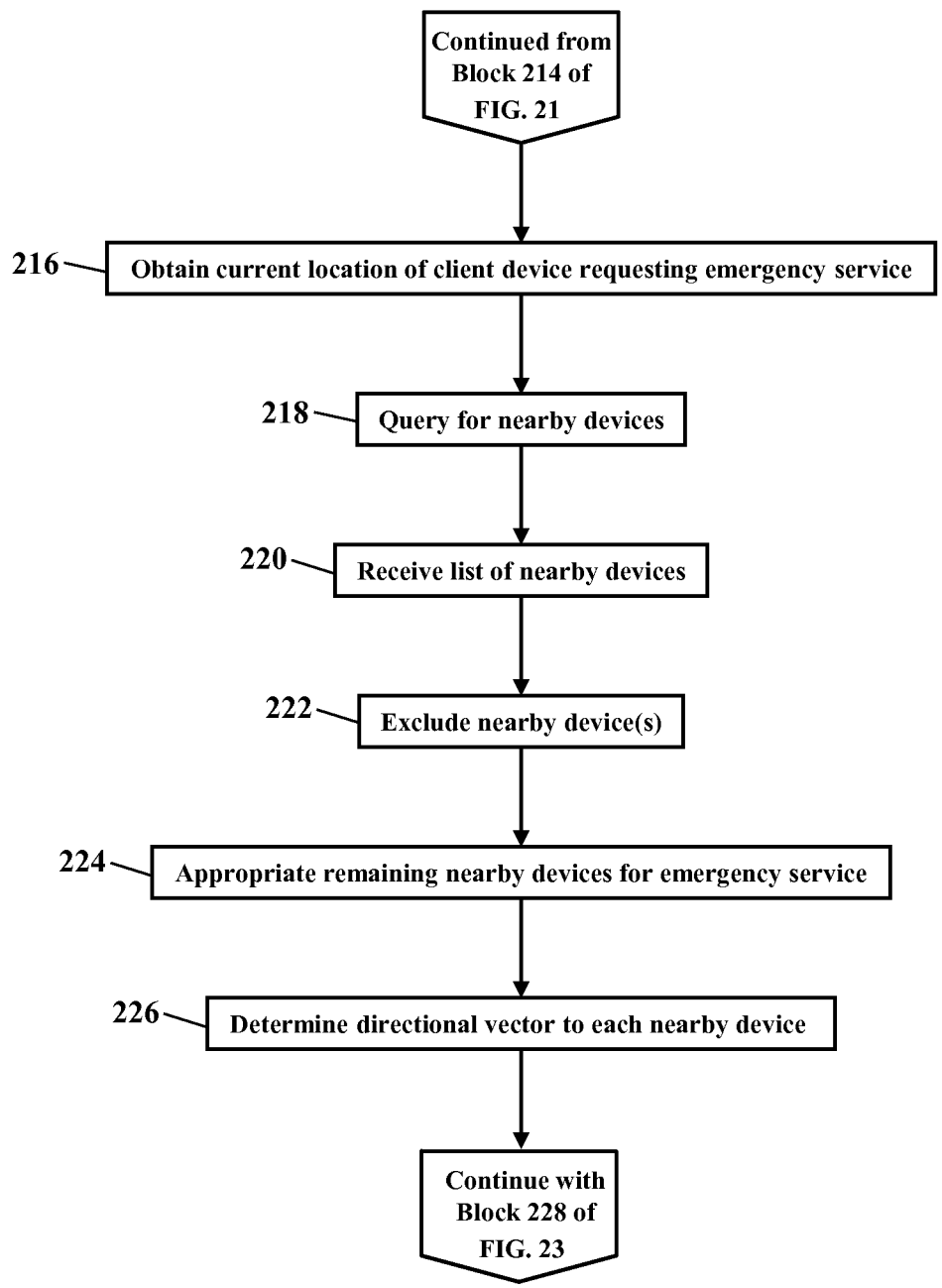
Figure 23:
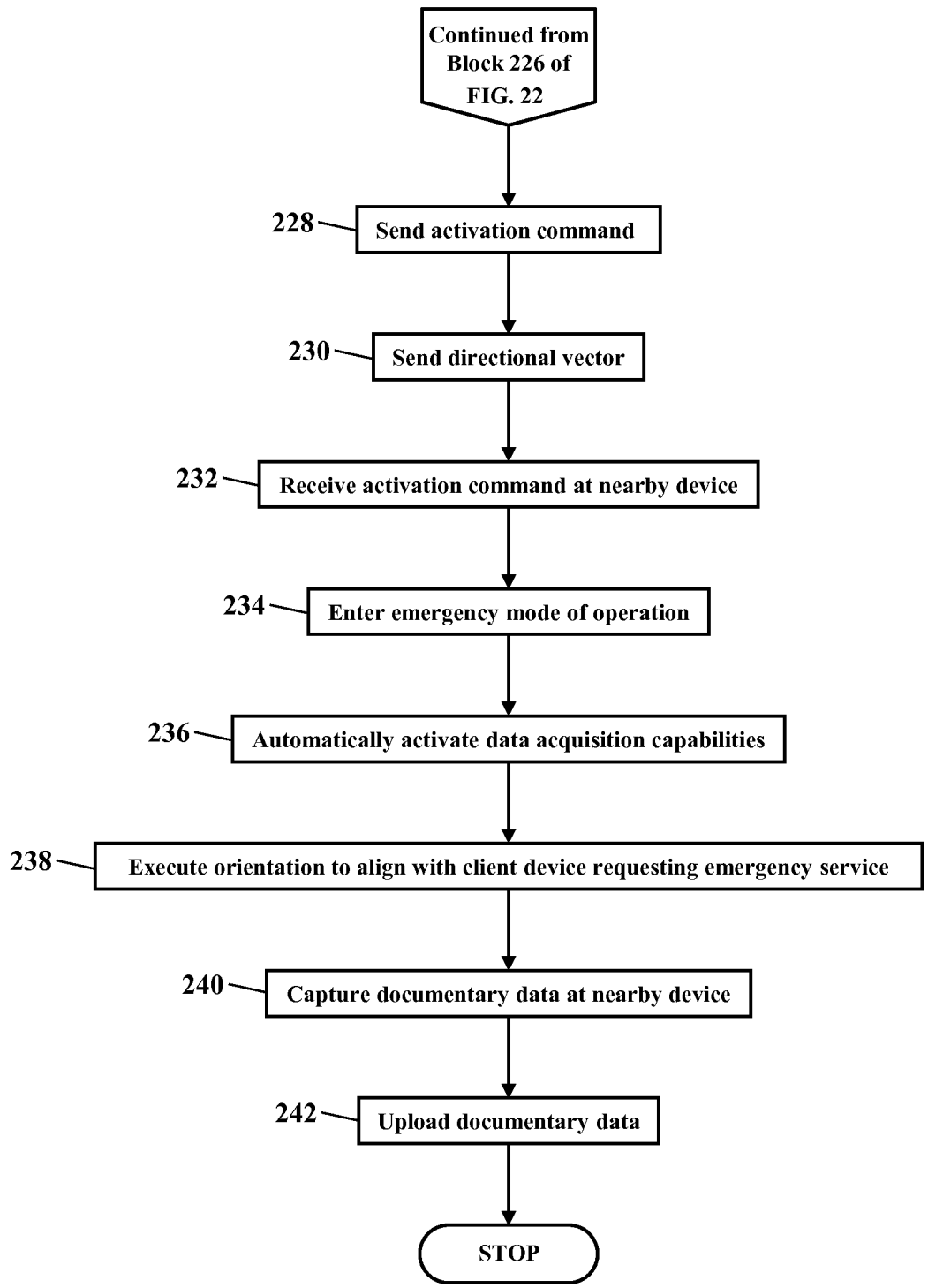

FIGS. 21-23 are flowcharts illustrating a method or algorithm for emergency services, according to exemplary embodiments. An emergency situation is determined (Block 200). The emergency mode 68 of operation is entered (Block 202). Any data acquisition capability is automatically activated (Block 204). Documentary data may be locally stored in memory (Block 206) and sent to remote destination (Block 208). The emergency notification 80 is sent (Block 210). When emergency notification 80 is received (Block 212), the emergency service 28 is provided (Block 214).

The flowchart continues with FIG. 22. The current location 40 is obtained (Block 216), and a query is made for the nearby devices (Block 218). The list 96 of devices is received in response (Block 220). Some nearby devices may be excluded (Block 222). One or more of the remaining nearby devices 38 may be appropriated for the emergency service 28 (Block 224). The directional vector 160 is determined from the nearby device 38 to the client device 22 requesting the emergency service 28 (Block 226).

The flowchart continues with FIG. 23. The activation command 110 (Block 228) and the directional vector 160 (Block 230) is/are sent to the nearby device 38. When the nearby device 38 receives the activation command 110 (Block 232), the nearby device 38 enters the emergency mode 68 of operation (Block 234) and automatically activates its camera, microphone, and any other data acquisition capability (Block 236). The nearby device 38 executes the orientation 162 (Block 238) to aid a nearby user in orienting to the direction of the client device 22 requesting the emergency service 28. The nearby device 38 captures documentary data (Block 240) and uploads the documentary data to any remote destination (Block 242).

Figure 24:
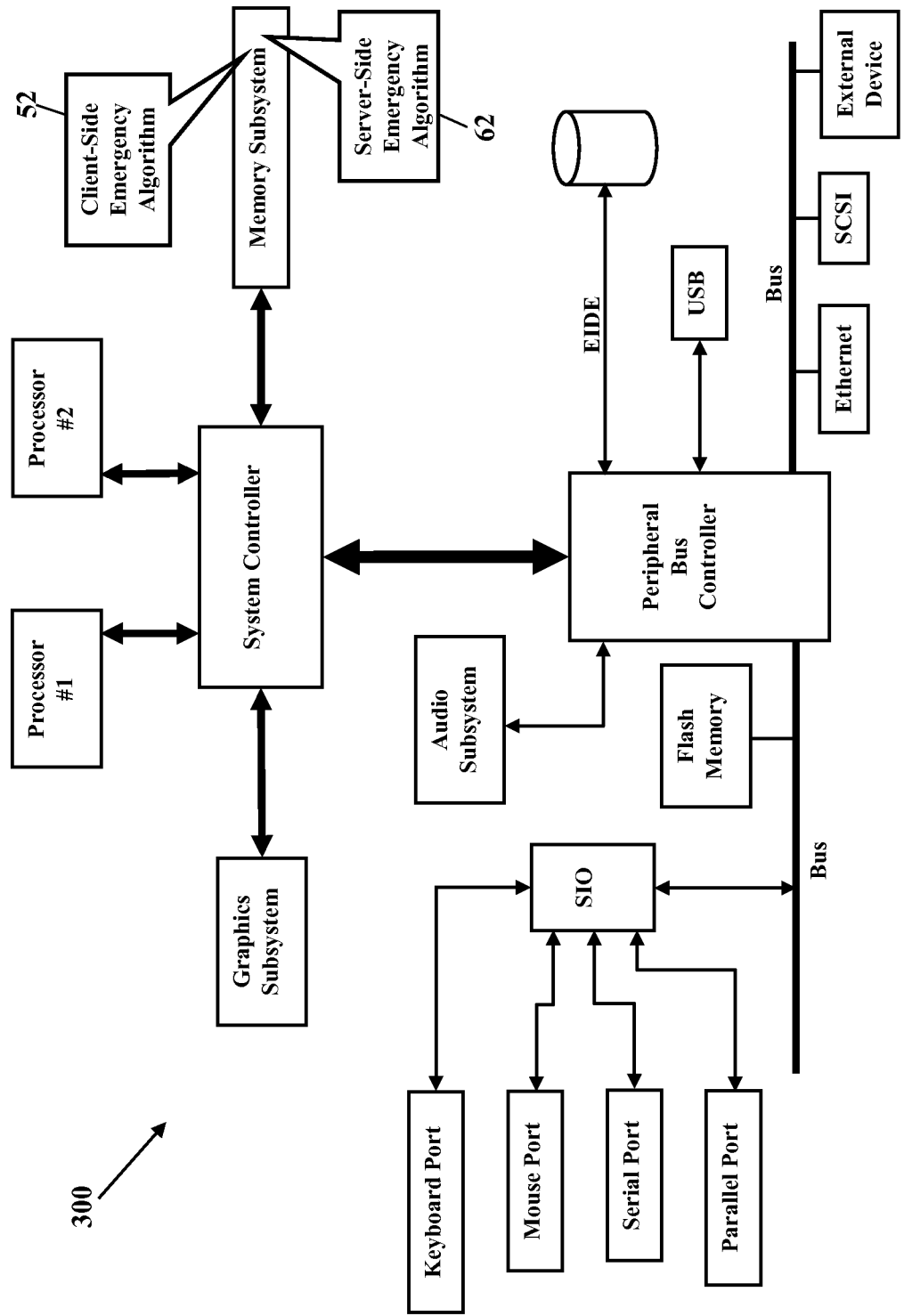

FIG. 24 is a schematic illustrating still more exemplary embodiments. FIG. 24 is a more detailed diagram illustrating a processor-controlled device 300. As earlier paragraphs explained, the device-side emergency algorithm 52 and/or the server-side emergency algorithm 62 may operate in any processor-controlled device. FIG. 24, then, illustrates the device-side emergency algorithm 52 and/or the server-side emergency algorithm 62 stored in a memory subsystem of the processor-controlled device 300. One or more processors communicate with the memory subsystem and execute either or both applications. Because the processor-controlled device 300 is well-known to those of ordinary skill in the art, no further explanation is needed.

Figure 25:
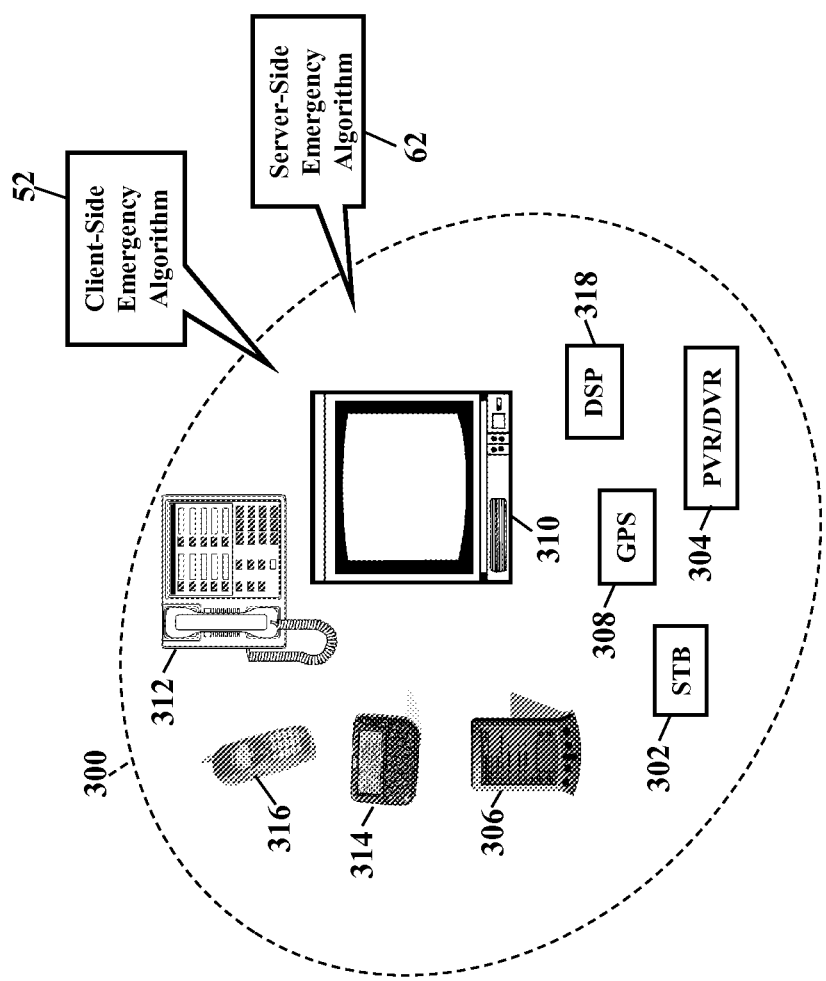

FIG. 25 depicts still more operating environments for additional aspects of the exemplary embodiments. FIG. 25 illustrates that the exemplary embodiments may alternatively or additionally operate within other processor-controlled devices 300. FIG. 25, for example, illustrates that the device-side emergency algorithm 52 and/or the server-side emergency algorithm 62 may entirely or partially operate within a set-top box ("STB") (302), a personal/digital video recorder (PVR/DVR) 304, personal digital assistant (PDA) 306, a Global Positioning System (GPS) device 308, an interactive television 310, an Internet Protocol (IP) phone 312, a pager 314, a cellular/satellite phone 316, or any computer system, communications device, or any processor-controlled device utilizing a digital signal processor (DP/DSP) 318. The processor-controlled device 300 may also include watches, radios, vehicle electronics, clocks, printers, gateways, mobile/implantable medical devices, and other apparatuses and systems. Because the architecture and operating principles of the various processor-controlled devices 300 are well known, the hardware and software componentry of the various processor-controlled devices 300 are not further shown and described.

FIG. 26 is a block diagram further illustrating the client device 20, and/or the nearby device 38, according to exemplary embodiments. Here either the client device 20 or the nearby device 38 may comprise a radio transceiver unit 452, an antenna 454, a digital baseband chipset 456, and a man/machine interface (MMI) 458. The transceiver unit 452 includes transmitter circuitry 460 and receiver circuitry 462 for receiving and transmitting radio-frequency (RF) signals. The transceiver unit 452 couples to the multiple input, multiple output ("MIMO") system 58 for converting electrical current to and from electromagnetic waves. The digital baseband chipset 456 may have a digital signal processor (DSP) 464 and performs signal processing functions for audio (voice) signals and RF signals. As FIG. 26 shows, the digital baseband chipset 456 may also include an on-board microprocessor 466 that interacts with the man/machine interface (MMI) 458. The man/machine interface (MMI) 458 may comprise a display device 468, a keypad 470, and a subscriber identity module 400. The on-board microprocessor 466 may perform TDMA, CDMA, GSM or other protocol functions and control functions. The on-board microprocessor 466 may also interface with the subscriber identity module 400 and with the device-side emergency algorithm 52 and/or the server-side emergency algorithm 62.

Exemplary embodiments may be applied to any signaling standard. As those of ordinary skill in the art recognize, FIG. 26 may illustrate a Global System for Mobile (GSM) communications device. That is, the client device 20 and/or the nearby device 38 may utilize the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, WI-FI®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for providing emergency services, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:
    receiving, at a server, an indication that an emergency notification was sent from a communications device;
    determining, by the server, a first location of the communications device;
    identifying, by the server, a nearby mobile device based at least on a second location of the nearby mobile device being within a predefined geographic vicinity of the first location;
    determining a relationship between a camera resolution of the nearby mobile device and a distance between the second location and the first location;
    comparing the relationship to a threshold selection value; and
    based on the relationship meeting or exceeding the threshold selection value, causing the nearby mobile device to capture image data from a camera associated with the nearby mobile device.

2. The method according to claim 1, further comprising querying a home location register to determine the first location, wherein the second location is within a predetermined distance from the first location.

3. The method according to claim 1, wherein the predefined geographic vicinity comprises a circular area around the first location having a radius and wherein the method further comprises excluding a nearby device having a distance from the first location that exceeds the radius.

4. The method according to claim 1, further comprising determining a vector from the first location.

5. A system, comprising:
    a processor; and
    memory to store instructions that cause the processor to perform operations, the operations comprising:
        receiving an indication that an emergency notification was sent from a communications device;
        determining a first location of the communications device;
        identifying a nearby mobile device based at least on a second location of the nearby mobile device being within a predefined geographic vicinity of the first location;
        determining a relationship between a camera resolution of the nearby mobile device and a distance between a nearby mobile device location of the first nearby mobile device and the first location;
        comparing the relationship to a threshold selection value; and
        based on the relationship meeting or exceeding the threshold selection value, causing the nearby mobile device to capture image data from a camera associated with the nearby mobile device.

6. The system according to claim 5, the operations further comprising querying a home location register for the first location.

7. The system according to claim 5, wherein the operations further comprise sending an activation command to the nearby mobile device.

8. The system according to claim 5, wherein the operations further comprise excluding a nearby device having a distance from the first location that exceeds a radius.

9. The system according to claim 5, wherein the operations further comprise determining a vector indicative of a relative location of the nearby mobile device to the first location.

10. A non-transitory computer readable medium storing executable instructions that cause a processor executing to effectuate operations, the operations comprising:
    receiving, at a server, an indication that an emergency notification was sent from a communications device;
    determining, by the server, a first location of the communications device;
    identifying a nearby mobile device based at least on a second location of the nearby mobile device being within a predefined geographic vicinity of the first location;
    determining a relationship between a camera resolution of the nearby mobile device and a distance between a nearby mobile device location of the first nearby mobile device and the first location;
    comparing the relationship to a threshold selection value; and
    based on the relationship meeting or exceeding the threshold selection value, causing the nearby mobile device to capture image data from a camera associated with the nearby mobile device.

11. The non-transitory computer readable medium according to claim 10, wherein determining the first location comprises querying a home location register for the first location.

12. The non-transitory computer readable medium according to claim 10, wherein the operations further comprise sending an activation command to the nearby mobile device.

13. The non-transitory computer readable medium according to claim 10, wherein the operations further comprise excluding a nearby device having a distance from the first location that exceeds a radius.

14. The non-transitory computer readable medium according to claim 10, wherein the operations further comprise: determining a vector indicative of a relative location of the nearby mobile device to the first location of the communications device.

* * * * *